(12) United States Patent
Teotia et al.

(10) Patent No.: US 10,346,315 B2
(45) Date of Patent: Jul. 9, 2019

(54) LATCHLESS, NON-BLOCKING DYNAMICALLY RESIZABLE SEGMENTED HASH INDEX

(71) Applicant: Oracle International Corporation, Redwood Shores, CA (US)

(72) Inventors: Siddharth Teotia, Foster City, CA (US); Krishna Kunchithapadam, Portland, OR (US); Tirthankar Lahiri, Palo Alto, CA (US); Jesse Kamp, Castro Valley, CA (US); Michael J. Gleeson, Saratoga, CA (US); Juan R. Loaiza, Woodside, CA (US); Garret F. Swart, Palo Alto, CA (US); Neil J. S. MacNaughton, Los Gatos, CA (US); Kam Shergill, Maidenhead (GB)

(73) Assignee: Oracle International Corporation, Redwood Shores, CA (US)

( * ) Notice: Subject to any disclaimer, the term of this patent is extended or adjusted under 35 U.S.C. 154(b) by 155 days.

(21) Appl. No.: 15/606,327

(22) Filed: May 26, 2017

(65) Prior Publication Data
US 2018/0341596 A1 Nov. 29, 2018

(51) Int. Cl.
G06F 16/22 (2019.01)
G06F 16/901 (2019.01)
G06F 12/1018 (2016.01)
G06F 16/2453 (2019.01)

(52) U.S. Cl.
CPC ...... *G06F 12/1018* (2013.01); *G06F 16/2255* (2019.01); *G06F 16/2453* (2019.01); *G06F 16/9014* (2019.01)

(58) Field of Classification Search
CPC .......................... G06F 17/3033; G06F 12/1018
See application file for complete search history.

(56) References Cited

U.S. PATENT DOCUMENTS

| 5,893,086 A * | 4/1999 | Schmuck ............ G06F 11/1435 |
| 2004/0225719 A1 | 11/2004 | Kisley et al. |
| 2012/0158729 A1* | 6/2012 | Mital .................... G06F 15/167 707/738 |

(Continued)

FOREIGN PATENT DOCUMENTS

WO WO 2007/045839 A2 4/2007

OTHER PUBLICATIONS

Wikipedia, the free encyclopedia, "Cuckoo Hasing", https://en.wikipedia.org/wiki/Cuckoo_hashing, last viewed on Jul. 31, 2017, 7 pages.

(Continued)

*Primary Examiner* — William Spieler
(74) *Attorney, Agent, or Firm* — Hickman Palermo Becker Bingham LLP

(57) ABSTRACT

A hashing scheme includes a cache-friendly, latchless, non-blocking dynamically resizable hash index with constant-time lookup operations that is also amenable to fast lookups via remote memory access. Specifically, the hashing scheme provides each of the following features: latchless reads, fine grained lightweight locks for writers, non-blocking dynamic resizability, cache-friendly access, constant-time lookup operations, amenable to remote memory access via RDMA protocol through one sided read operations, as well as non-RDMA access.

21 Claims, 11 Drawing Sheets

(56) References Cited

U.S. PATENT DOCUMENTS

| | | | | |
|---|---|---|---|---|
| 2012/0323970 | A1* | 12/2012 | Larson | G06F 17/30949 |
| | | | | 707/800 |
| 2014/0200166 | A1* | 7/2014 | Van Rooyen | G06F 19/22 |
| | | | | 506/38 |
| 2014/0337593 | A1* | 11/2014 | Holbrook | G06F 3/0614 |
| | | | | 711/162 |
| 2016/0306923 | A1* | 10/2016 | van Rooyen | G06F 19/28 |
| 2017/0109317 | A1 | 4/2017 | Hack et al. | |
| 2017/0300592 | A1* | 10/2017 | Breslow | G06F 17/30949 |
| 2018/0341653 | A1 | 11/2018 | Teotia | |

OTHER PUBLICATIONS

Wang et al., "C-Hint: An Effective and Reliable Cache Management for RDMA-Accelerated Key-Value Stores", dated 2014, 2 pages.

Tyler Szepesi, et al. "Nessie: A Decoupled, Client-Driven, Key-Value Store using RDMA", Copyright 2015 the authors CS-2015-09, 13 pages.

Mitchell et al., "Using One-Sided RDMA Reads to Build a Fast, CPU-Efficient Key-Value Store", 2013 USENIX Annual Technical Conference (USENIX ATC '13), 12 pages.

Kalia et al., "Using RDMA Efficiently for Key-Value Services", SIGCOMM'14, Aug. 17-22, 2014, Chicago, IL, USA, 15 pages.

Kalia et al., "Using RDMA efficiently for key-value services", dated 2014, 2 pages.

Kalia et al., "Using RDMA Efficiently for Key-Value Services", ACM SIGVOMM, https://www.researchgate.net/publication/266659972_Using_RDMA_Eff, 5 pages, Aug. 2014.

Fan et al., "MemC3: Compact and Concurrent MemCache With Dumber Caching and Smarter Hashing", NSDI'13, dated Apr. 2013, 14 pages.

Dragojević, et al., "FaRM: Fast Remote Memory", https://www.usenix.org/conference/nsdi14/technical-sessions/dragojević, dated Apr. 2014, 15 pages.

* cited by examiner

| | | | OVERFLOW-INDICATING BITS |
|---|---|---|---|
| BUCKET 000 | HR FOR K1 | HR FOR K2 | HR FOR K3 | 111 |
| BUCKET 001 | HR FOR K4 | HR FOR K5 | HR FOR K6 | 110 |
| BUCKET 010 | HR FOR K7 | HR FOR K8 | HR FOR K9 | 011 |
| BUCKET 011 | HR FOR K10 | | | 100 |

SEGMENT 500

| | | | |
|---|---|---|---|
| BUCKET 100 | HR FOR K11 | HR FOR K12 | HR FOR K13 | 101 |
| BUCKET 101 | HR FOR K14 | HR FOR K15 | HR FOR K16 | 110 |
| BUCKET 110 | HR FOR K17 | | | 100 |
| BUCKET 111 | HR FOR K20 | | | 100 |

SEGMENT 502

HASH TABLE 112

FIG. 5

LATCHLESS, NON-BLOCKING DYNAMICALLY RESIZABLE SEGMENTED HASH INDEX

CROSS-REFERENCE TO RELATED APPLICATIONS

This application is related to application Ser. No. 15/606,322, filed May 26, 2017, the entire contents of which is hereby incorporated by reference as if fully set forth herein.

FIELD OF THE INVENTION

The present invention relates to hash indexes and, more specifically, to a cache-friendly, latchless, non-blocking dynamically resizable hash index with constant-time lookup operations that is also amenable to fast lookups via remote memory access.

BACKGROUND

Hash indexes are indexes used to look up information based on key values. Specifically, a hash index includes a hash table. The storage areas in a hash table are referred to as "buckets". Within a hash table, the information associated with any given key value is stored in a hash record in the bucket that corresponds to the hash value produced by applying a hash function to the key value. For example, assume that the key "userid1" is associated with "name1". Under these circumstances, "name1" is stored in a hash record in the bucket that corresponds to the hash value produced by applying a hash function to "userid1".

Once data has been stored in the hash table in this manner, the data for any given key value may be quickly obtained by applying the hash function to the key value to produce a hash value, using the hash value to determine the bucket to which the hash value maps, and retrieving the data from a hash record in that bucket. For example, the hash function may be applied to "userid1" to identify the bucket that contains the information ("name1") for "userid1". Once the appropriate bucket is identified, the bucket contents may be read to quickly obtain the information ("name1") associated with the key value ("userid1"). Since the primary purpose of the hash table is to obtain information based on key values as quickly as possible, the lookup operations performed using a hashing scheme should be as fast as possible. Thus, it is desirable to avoid using latches to prevent conflicts between entities that are performing lookup operations and those that are modifying the data itself, since obtaining a latch prior to performing a lookup would significantly increase the time required to perform lookups.

Unfortunately, the performance benefit of using a hash table to access data depends heavily on the size of the hash table relative to the amount of information that must be stored therein. For example, if a hash table is too small, then the hash table's buckets will not be able to hold all of the hash records of the key values that hash to the hash buckets. Various techniques are available for hash buckets to "overflow" into other storage areas, but the larger the quantity of overflow data, the less efficient using the hash table becomes. For example, to find the hash record for a key value that hashes to a particular bucket, it would be highly inefficient to scan a chain of a million buckets that serve as overflow for that given bucket. Further, scans of the overflow chain are prone to cache misses, and bucket chaining cannot guarantee constant time lookup operations. In addition, bucket chaining does not combine well with remote direct memory access (RDMA) to the hash table, since following/traversing the bucket chain is equivalent to doing a number of dependent pointer dereferences, and thus increases the total number of RDMA read operations that a remote client would have to perform.

On the other hand, it is also inefficient for a hash table to be too large relative to the data to be stored therein. For example, it is wasteful of computing resources to create a hash table so large that the vast majority of the space allocated to its buckets goes unused.

One difficulty with sizing a hash table correctly is that the amount of information the hash table must store may vary over time. For example, assume that a hash table is used to store a record for each row of a database table. Initially, the database table may only be populated with 100 records. Thus, a relatively small hash table would suffice. However, as data is added to the database table, the number of hash records that need to be added to the hash table also increases. By the time the table reaches a million rows, it is highly likely that the initial size selected for the hash table would be insufficient.

When it is determined that the size of a hash table should be changed (either increased or decreased), the existing hash table may be discarded, and a new hash table may be created. For example, assume that each hash bucket is a fixed size. Under these circumstances, to increase the size of the hash table involves switching from a first hash function that hashes to a fewer number of buckets (e.g. 256) to a second hash function that hashes to a larger number of buckets (e.g. 1,024). Since there is no guarantee that, for any given key, the second hash function will produce the same hash value as the first hash function, all of the existing buckets must be discarded and the hash table must be rebuilt from scratch. During the rebuilding of the hash table, entities that require information from the hash table must either wait for the entire hash table to be rebuilt, or obtain the information some other way. Stated another way, resizing a hash index is typically a "stop the world" blocking operation where concurrent reads and write are blocked while the hash table is resized. Blocking concurrent reads is particularly undesirable because the primary purpose of the hash index is to provide fast reads. Consequently, it is preferable for a hashing scheme to allow readers to always make progress on obtaining the data they desire, even while the hash index is being resized.

Various approaches have been developed to address some of the problems relating to hash indexes. For example, Cuckoo Hashing (described in detail at en.wikipedia.org/wiki/Cuckoo_hashing) guarantees an O(1) lookup operation cost, but does not support resizability. Specifically, the hash table is fixed in size at compile time, and any rehashing is a complete blocking operation. On the other hand, linear hashing (described in detail at en.wikipedia.org/wiki/Linear_hashing) is a well-known dynamic hashing scheme that allows the hash table to be smoothly resized. However, linear hashing requires the presence of overflow bucket chains, which can lead to lookups operations that exceed O(1). In addition, when the hash table is being accessed through Remote Direct Memory Access (RDMA), overflow bucket chains can significantly increase the number of RDMA operations required for any given lookup operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram of a segmented hash table, according to an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A hashing scheme is described herein that provides a cache-friendly, latchless, non-blocking dynamically resizable hash index with constant-time lookup operations that is also amenable to fast lookups via remote memory access. According to an embodiment, the hash table is segmented, is amenable to both efficient RDMA and non-RDMA access, and implements linear hashing based resizing without having overflow bucket chains. Further, according to one embodiment, the hash table structure supports constant time latchless lookups. In the follow sections, it shall be described in detail how the hashing scheme provides each of the following features:
- latchless reads.
- fine grained lightweight locks for writers.
- non-blocking dynamic resizability.
- cache-friendly access.
- constant-time lookup operations.
- amenable to remote memory access via RDMA protocol through one sided read operations (only applicable to remote clients), as well as non-RDMA access (applicable to both traditional local and traditional remote database clients).

System Overview

Figure 1:
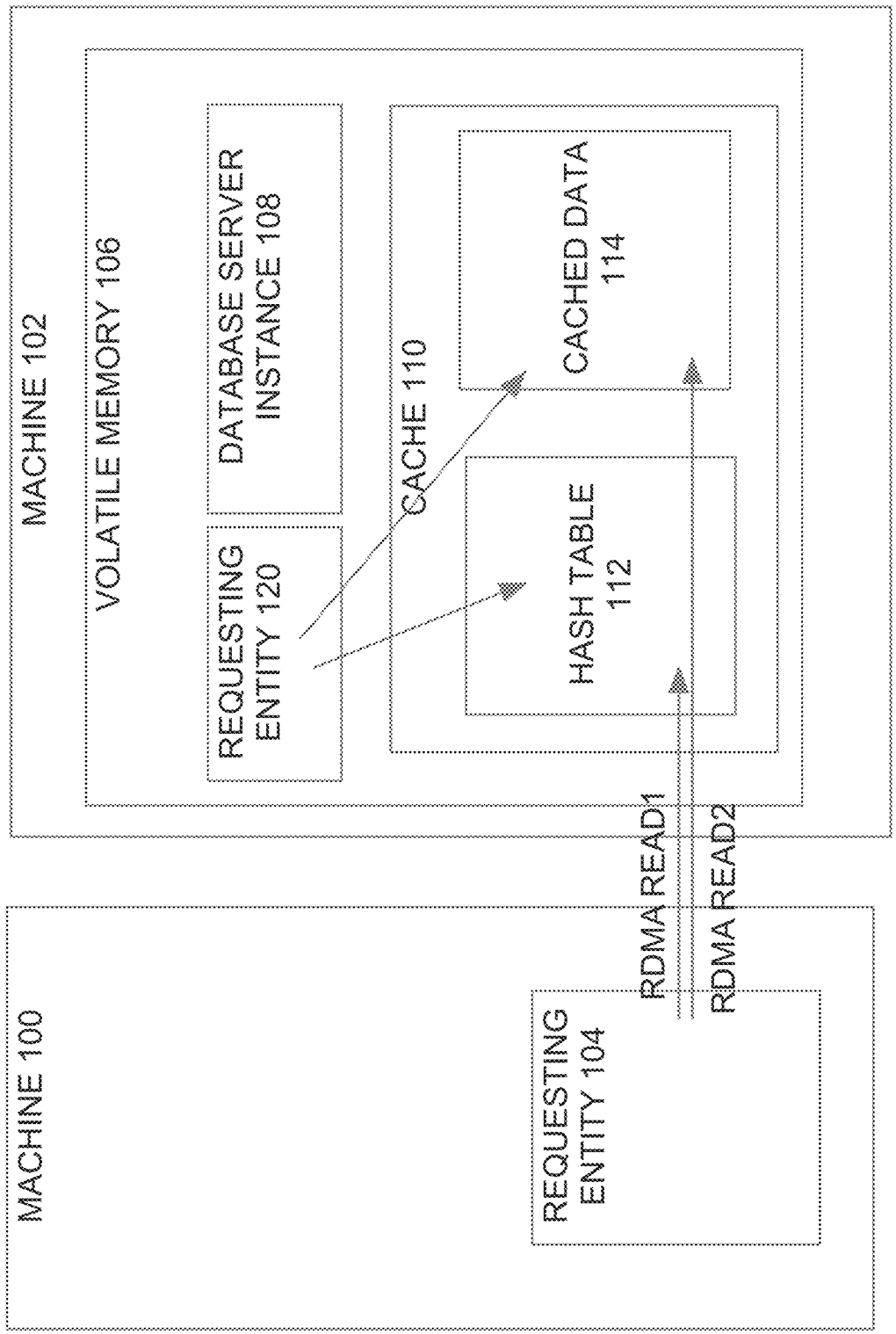
FIG. 1 is a block diagram of a system in which remote and local requesting entities access a hash table that is created and maintained using the techniques described herein, according to an embodiment.

FIG. 1 is a block diagram of a system configured to enable "requesting entities" to retrieve data using a cache-friendly, latchless, non-blocking dynamically resizable hash index. As shall be described in greater detail hereafter, the hash index is non-blocking for readers because readers are not prevented from reading, even when the data is in-flux. Instead, a mechanism is provided to allow readers to determine whether the data obtained from the hash index was in flux. If the data was in-flux, the readers simply try again. The hash index can be used by both RDMA or non-RDMA clients. Remote clients that are capable of doing remote memory access can use RDMA to access the hash index. Remote clients can also use non-RDMA in the same manner that is typical with traditional remote database clients. Thus, non-RDMA access is applicable to both remote and local clients. Requesting entities that are local to the hash index access the hash index just like they access any other data structure in memory of database server via CPU instructions.

Referring to FIG. 1, a remote requesting entity 104 is executing on a machine 100 that is remote relative to hash table 112, and a local requesting entity 120 is executing on a machine 102 in which hash table 112 resides. The requesting entities may be any software entities that require information that corresponds to key values. For the purpose of illustration, an example shall be given in which the information that corresponds to key values includes data items managed by a database server instance. Software entities that require data items managed by a database server instance may include, for example, database applications and other database server instances. The requesting entity may also be client-side database server code that is linked into a database application, or the combination of such code and the database application into which the code is linked.

Overview of RDMA Use of the Hash Table

Requesting entities, such as requesting entity 104, that do not reside on the same machine as hash table 112 may use RDMA to access hash table 112, according to an embodiment. Specifically, to retrieve "target data" specified in a database command, the requesting entity 104 applies a hash function to a key value associated with the target data to produce a hash value. The requesting entity 104 then uses the hash value to determine a hash bucket to which the key value maps. The requesting entity 104 then determines a virtual address that corresponds to that hash bucket.

Once the virtual address of the hash bucket is determined, the requesting entity 104 uses Remote Direct Memory Access (RDMA) to obtain, from the volatile memory of the server machine 102, bucket data from the appropriate hash bucket. The bucket data has a hash entry that indicates where the target data resides in the server machine 102. Information about where the target data resides in the volatile memory of the host server machine is referred to herein as "target location information". Based on the target location information obtained from the hash table, the requesting entity uses RDMA to retrieve the target data from the host server machine without involving the database server instance.

A database server instance 108 is executing on a different machine 102. In the case where requesting entity 104 is a database application, requesting entity 104 conventionally retrieves target data by sending database commands to database server instance 108. Such is also the case where requesting entity 104 is another database server instance that requires information managed by database server instance 108. However, using the techniques described herein, some or all of the data required by requesting entity 104 may be obtained through RDMA access to the volatile memory 106 of machine 102.

In the embodiment illustrated in FIG. 1, the target data is a subset of the cached data 114 that resides in a cache 110 allocated within volatile memory 106. Cache 110 also includes a hash table 112 that includes information about where specific data items are stored within the cached data 114. As illustrated in FIG. 1, target data may be retrieved from cached data 114 by the requesting entity 104 first sending an RDMA to read target location information from hash table 112, and a second RDMA to read the target data from cached data 114. The RDMA made to obtain the target location information shall be referred to herein as the "for-location-RDMA" and the one or more RDMAs made to retrieve the target data shall be referred to herein as "for-data-RDMAs".

Figure 2:
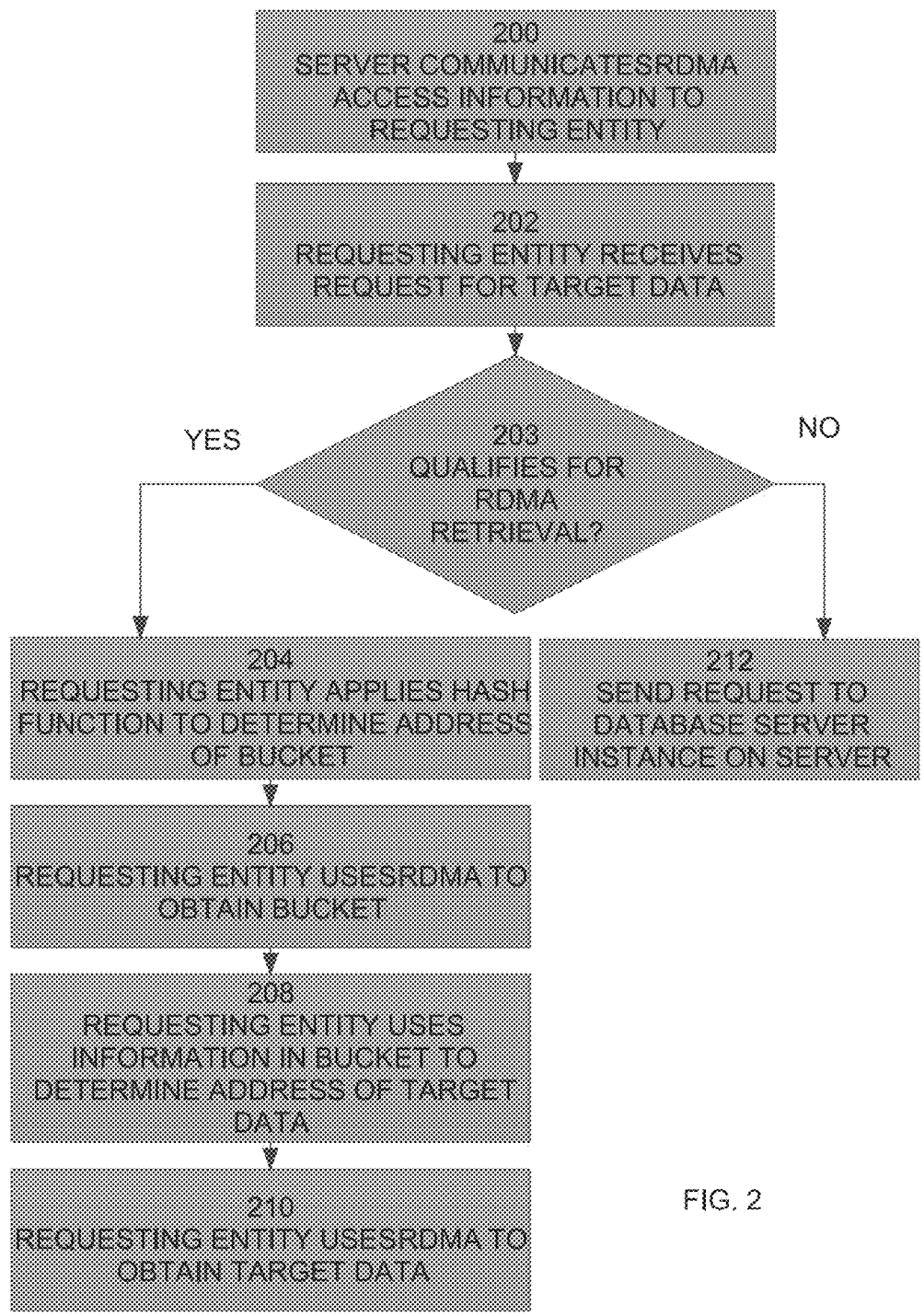
FIG. 2 is a flowchart illustrating steps for transferring data managed by a database server instance to a requesting entity using a hashing scheme that allows nonblocking resize of the hash table, according to an embodiment.

FIG. 2 is a flowchart that illustrates how requesting entity 104 may use the hashing scheme described herein to retrieve data that is managed by database server instance 108 from volatile memory 106 without involving database server instance 108. Referring to FIG. 2, at step 200, machine 102 sends "RDMA access information" to requesting entity 104. The RDMA access information is typically sent by database server instance 108 during bootstrap before any remote access can happen. The term "RDMA access information" generally refers to the information that requesting entity 104 needs in order to determine (a) which data is available for RDMA retrieval, and (b) how to request the target location information for that data.

The target location information is maintained in buckets within a hash table 112 that is constructed and dynamically resized according to the techniques described herein. In such an embodiment, the RDMA access information may include information about which memory regions are available for reading directly via RDMA, and the base addresses and sizes of such regions that contain hash table 112 and cached data 114. Based on the RDMA access information, requesting entity 114 is able to determine the virtual address to use to retrieve data from any given bucket within hash table 112. How the requesting entity 104 uses the hash table 112 to retrieve target data using RDMA shall be explained in greater detail hereafter.

After obtaining the RDMA access information, the requesting entity 104 may use RDMA to retrieve any data items that the RDMA access information indicates are available for RDMA retrieval. All other data is retrieved by requesting entity 104 through conventional interaction with database server instance 108.

Referring again to FIG. 2, steps 202 to 212 indicate how requesting entity 104 handles requests for target data. Specifically, at step 202, requesting entity 104 receives a request for target data. For the purpose of illustration, it shall be assumed that the request is in the form "SELECT name FROM emp WHERE ssn=123-45-6789". In this example, the target data is the name of the employee whose social security number is 123-45-6789. The target data resides in the column "name" of the table "emp". The social security numbers reside in the column "ssn" of the same table "emp". For the purpose of explanation, it shall be assumed that "ssn" is the primary key of table "emp", and therefore is guaranteed to be unique.

At step 203, the requesting entity 104 determines whether the target data qualifies for RDMA retrieval. According to one embodiment, target data qualifies for retrieval when (a) the target data is in the cached data 114 and (b) the request is a point lookup based on a unique key.

For example, during step 203, requesting entity 104 may send a SQL command (e.g. "SELECT name FROM emp WHERE ssn=123-45-6789") to database server instance 108. Database server instance 108 determines how to execute (parses and compiles) the SQL command. In the present example, the database server instance 108 will determine EMP table has been designated by a user to use fast remote reads ("FAST-LOOKUP-OPTIMIZED"). Thus, the query compilation will take this into account and send back an appropriate handle for the SQL query. Specifically, the database server instance 108 then sends back to the requesting entity 104 a handle associated with the SQL command (which may be used by requesting entity 104 for subsequent executions of the SQL command to avoid the need to reparse and recompile the SQL command) that enables the data requested by the SQL command to be retrieved using RDMA. Based on the handles received from database server instance 108, the requesting entity 104 knows when to send a conventional request to database server instance 108, and when to use RDMA to retrieve the target data directly from volatile memory 106.

For the purpose of illustration, it shall be assumed that the entire "emp" table is available for RDMA retrieval, and that social security number is a unique key. Therefore, control passes from 203 to 204. Otherwise, control would pass from 203 to 212 and the requesting entity 104 would request the target data through conventional interaction with database server instance 108. Although only a single table is available in the RDMA example given herein, the techniques described herein are not limited relative to the number of tables or other database objects that are made available via RDMA. In situations where multiple tables are made available via RDMA, each such table may have a corresponding hash table similar to hash table 112.

At step 204, the hash function is applied to the unique key value associated with the target data (i.e. 123-45-6789) to generate a hash value. Some bits of the hash value are used to identify a hash bucket of hash table 112. The bits used of the hash value that are used to identify the hash bucket are referred to herein as the "bucket-identifying bits". Using hash function that produces hash values that have more bits than are necessary to identify buckets provides various benefits. One such benefit is that the hash table may be resized without changing the hash function itself. Instead of changing the hash function, the number of bits used as bucket-identifying bits may be increased or decreased as needed. Increasing the number of bucket-identifying bits by one effectively doubles the hash table by doubling the number of addressable buckets. Similarly, decreasing the number of bits used as bucket-identifying bits effectively halves the hash table by reducing by half the number of addressable buckets.

Once a hash bucket that corresponds to the unique key of the target data has been identified, a bucket-to-address mapping is consulted to determine the address from which to retrieve the target location information.

At step 206, requesting entity 104 sends a for-location-RDMA to obtain bucket data from the identified bucket from hash table 112. At step 208, requesting entity 104 uses information contained in the bucket data to determine the location of the target data. Specifically, at step 208, requesting entity 104 locally parses the bucket retrieved via RDMA to determine the location of the target data. At step 210, requesting entity 104 uses the location of the target data to perform an RDMA to retrieve the target data from cached data 114.

Overview of Non-RDMA Use of the Hash Table

As mentioned above, remote clients can use non-RDMA in the same manner that is typical with traditional remote database clients. Thus, non-RDMA access is applicable to both remote and local clients. Every non-RDMA client (whether local or remote) accesses the hash index through CPU instructions. In an embodiment that uses a database server available from Oracle Corporation, non-RDMA requesting entities that may use hash table 112 may include, for example, the following clients:

Local PL/SQL clients
Local OCI (Oracle Call Interface) clients
Remote OCI clients However, the hashing scheme described herein are not limited to any particular database environment, and may even be used in environments that do not involve database systems. In the context of database systems, such non-RDMA clients may use the hash table for their key-based SELECT queries. These application/clients may experience significant performance improvement by obtaining information they require using the hash index structure described herein.

To use hash table 112 to perform fast lookups of data based on key values, requesting entity 120 may, for example, perform the steps illustrated in FIG. 2 except that direct data retrieval involves reading local memory rather than performing RDMA operations. Specifically, step 203 would determine whether the target data is indexed by hash table 112, and steps 206 and 210 involve local memory reads rather than RDMA operations.

The Cached Data

Typically, volatile memory 106 will not be large enough to hold all of the data that is managed by database server instance 108. Therefore, according to an embodiment, upon start-up, database server instance 108 scans a database dictionary (not shown) to determine which data objects to pre-load into cache 110. The data dictionary will indicate which database objects/tables a user has enabled for fast remote lookups/reads. The database dictionary may be populated with such information, for example, based on arguments of the Data Dictionary Language (DDL) commands used to create the database objects.

After a database object has been created, an "ALTER TABLE" DDL statement may be issued to add the "FAST-LOOKUP-OPTIMIZED" designation to a database object that was not FAST-LOOKUP-OPTIMIZED when created. In response to such a command, the data dictionary is updated and the target database object is loaded into cache 110.

Figure 3:
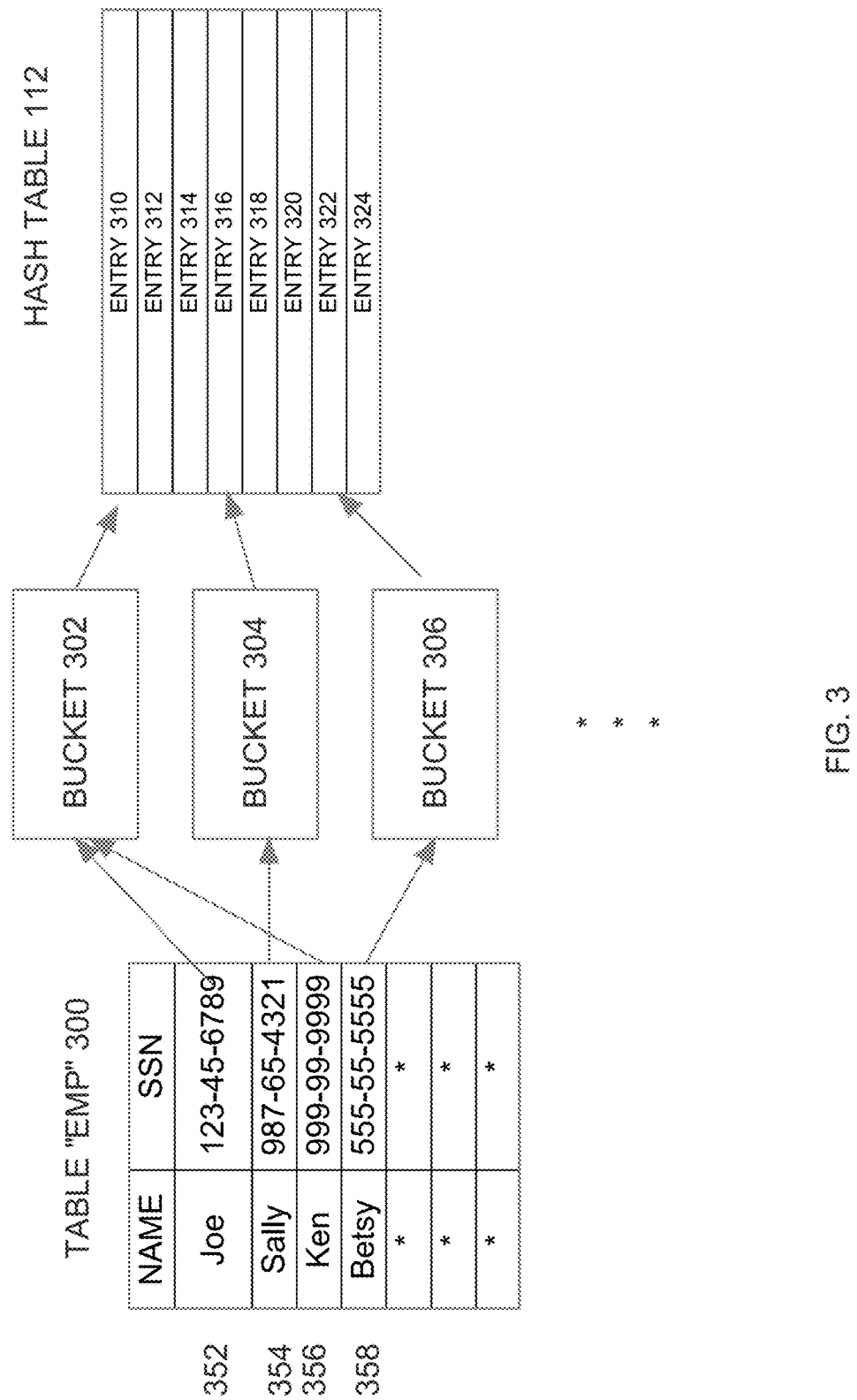
FIG. 3 is a block diagram illustrating how rows of a table may be hashed to a hash table, according to an embodiment.

For the purpose of illustration, it shall be assumed that the "emp" table 300 illustrated in FIG. 3 is one of the tables designated as FAST-LOOKUP-OPTIMIZED. Consequently, the database dictionary used by database server instance 108 includes information that indicates that emp table 300 is FAST-LOOKUP-OPTIMIZED. In this example, the FAST-LOOKUP-OPTIMIZED designation is made at the table level of granularity. However, the FAST-LOOKUP-OPTIMIZED designation may be at any level of granularity, including entire tables, partitions of tables, etc.

Once database server instance 108 determines which tables are FAST-LOOKUP-OPTIMIZED, database server instance 108 scans the blocks of the on-disk copy of those tables, and loads the scanned blocks into volatile memory 106. The blocks scanned from disk are brought into cache and locked and pinned such that they are never thrown out of volatile memory 106 unless all requesting entities are informed of the change. The blocks may be evicted from memory, after informing all requesting entities, in situations where the database server instance 108 needs to use the volatile memory for other purposes. One such other purpose may be, for example, to load a different, more frequently accessed database object, for FAST-LOOKUP.

The blocks loaded into volatile memory 106 reflect the committed state of the blocks as of the time that the blocks are loaded. Any subsequent updates are made to the cached blocks, so that the cached blocks always reflect the latest updates. Updates made to the block after the block is loaded in the cache may cause the cached version of the block to contain uncommitted data. According to an embodiment, transactional information is maintained in the cached block to indicate which data contained within the block is committed, and which is uncommitted. To avoid reading uncommitted data from the block, requesting entities that use RDMA to retrieve the cached version of the block inspect the transactional information in the block to determine whether the data that they require from the block is committed. If the data that they require is uncommitted, then the requesting entities cannot use the data, and instead must update the data through conventional interaction with the database server instance 108.

Referring to FIG. 3, it illustrates the logical organization of emp table 300 on disk. In the illustrated embodiment, emp table 300 is organized into two columns: "name" and "ssn". The "ssn" column is subject to a uniqueness constraint, which prevents rows from having the same ssn value. In this example, a single column is used as the unique key. However, unique keys can be composite keys, composed of values from any number of columns. While emp table 300 is logically organized as illustrated in FIG. 3, the values that populate emp table 300 are physically stored on disk in disk blocks. As mentioned above, when database server instance 108 determines that emp table 300 is FAST-LOOKUP-OPTIMIZED, those blocks are scanned from disk and loaded into cache 110.

Figure 4:
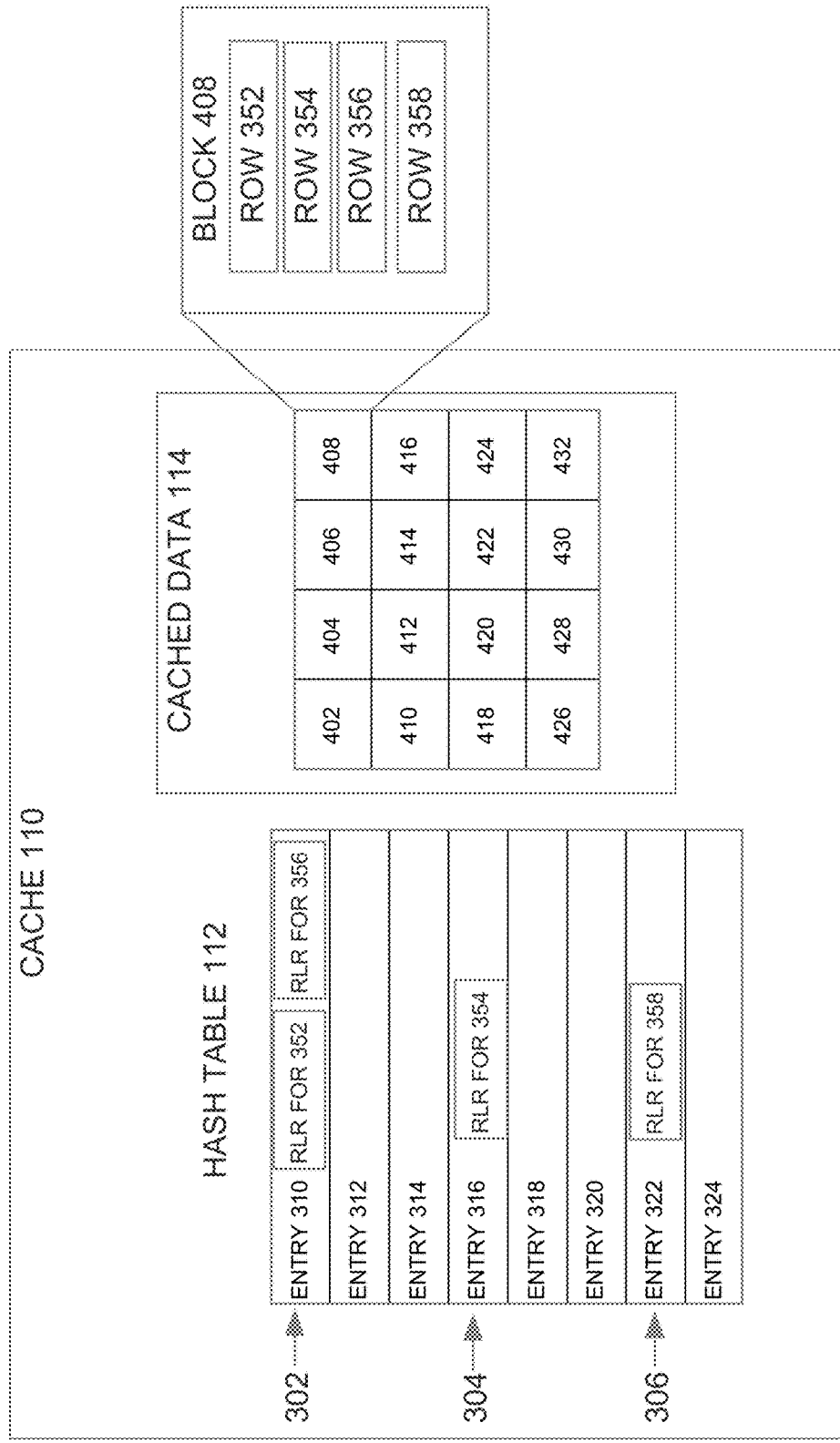
FIG. 4 is a block diagram illustrating a hash table and cached data that a requesting entity is able to access using the hashing scheme described herein.

FIG. 4 is a block diagram that illustrates how data from the rows of emp table 300 are loaded into cache 110 as a set of blocks 402-432. According to an embodiment, each of blocks 402-432 is 8K bytes, and can store the data from multiple rows of emp table 300. In FIG. 4, an expanded view of block 408 shows that block 408 includes the data from four rows 352-358 of emp table 300. After being loaded, blocks 402-432 are locked to prevent blocks 402-432 from being replaced within cache 110 to make room to load additional data into cache 110.

The Hash Table

According to an embodiment, as the blocks of a FAST-LOOKUP-OPTIMIZED database object are loaded into volatile memory 106, the database server instance 108 populates a hash table 112 with information for accessing the data items within those blocks. Using hash table 112 to facilitate fast lookup of data items that have been cached in volatile memory is merely one example of the virtually infinite number of ways the dynamically resizable non-blocking hash scheme described herein may be used. For example, the hashing scheme described herein may be used in any situation in which information is looked up based on key values. The information that is to be looked up based on key values is stored in hash records. Each hash record is stored in the bucket of hash table 112 to which the corresponding key value hashes, if room is available therein. If no room is available, the hash record may be stored in the bucket that resides immediately after that bucket, as shall be explained in greater detail hereafter.

In the present example, the information that is to be looked up based on key values is the location information of the cached rows of a database table. In such an embodiment, each hash record corresponds to a row, and contains the data for locating the row in volatile memory. In one embodiment, each bucket is a "fat" bucket that stores a maximum of three hash records. The specific pieces of information contained in the hash record may vary from implementation to implementation. Examples of types of information that may be included in the hash record shall be described in greater detail hereafter.

In the embodiment illustrated in FIG. 3, hash table 112 includes entries 310-324, each of which corresponds to a bucket. Specifically, entries 310, 316 and 322 respectively correspond to buckets 302, 304 and 306.

The operation of populating hash table 112 shall be illustrated with reference to block 408. When block 408 is loaded into cache 110, database server instance 108 performs the following for each row in the block:

reads the unique key value of the row by walking the row and extracting the values of key column(s)

generates a hash value by applying a hash function to the unique key value determines the hash bucket that corresponds to the hash value using some Least Significant Bits (LSBs) from the hash value stores a hash record for locating the row in the hash table entry that corresponds to the bucket.

For example, in response to loading block 408, the database server instance 108 applies a hash function to 123-45-6789 (the unique key of row 352). According to an embodiment, the hash function produces a 64-bit hash value. If there are 1024 buckets in hash table 112, the ten least significant bits of the hash value may be used to as the bucket index to determine the bucket number to which the key value maps. As illustrated in FIG. 3, the bucket-identifying bits of the resulting hash value correspond to bucket 302. Therefore, hash record for row 352 is stored in entry 310 of hash table 112.

After storing hash record for row 352 in entry 310, the database server instance 108 then applies the hash function to 987-65-4321 (the unique key of row 354). As illustrated in FIG. 3, the bucket-identifying bits of the resulting hash value correspond to bucket 304. Therefore, hash record for row 354 is stored in entry 316 of hash table 112.

After storing hash record for row 354 in entry 316, the database server instance 108 then applies the hash function to 999-99-9999 (the unique key of row 356). As illustrated in FIG. 3, the bucket-identifying bits of the resulting hash value correspond to bucket 302. Therefore, the hash record for row 356 is stored in entry 310 of hash table 112.

After storing hash record for row 356 in entry 310, the database server instance 108 then applies the hash function to 555-55-5555 (the unique key of row 358). As illustrated in FIG. 3, the bucket-identifying bits of the resulting hash value correspond to bucket 306. Therefore, the hash record for row 358 is stored in entry 322 of hash table 112.

FIG. 4 shows hash table 112 after hash table 112 has been populated with the hash records for the rows in block 408. Specifically, entry 310 contains the hash records for rows 352 and 356, entry 316 contains the hash record for row 354, and entry 322 contains the hash record for row 358.

Bucket Overflow

Hash table entries have finite space. Therefore, it is possible for a row to hash to a bucket whose hash table entry does not have enough space for the hash record of the row. According to one embodiment, when this occurs, the database server instance 108 simply stores the hash record in the hash table entry for the next bucket. As shall be explained below, if there is no room in the next bucket it may not be stored in the hash table at all. Thus, if the hash record for a row that hashes to bucket 302 does not fit in entry 310, then the hash record is instead stored in entry 312. One embodiment implements the concept of "two buddy buckets". In such an embodiment, if a key K hashes to bucket B, then either it will be in bucket B or next adjacent bucket B+1 if B is full. This knowledge is known both during building the hash table and inserting hash records and querying the hash table for SELECT queries. Consequently, the cost of SELECT query (lookup operation) is guaranteed to be a constant time operation. In such an embodiment, if the requesting entity 104 cannot find a hash record for keyX in the bucket data of the bucket to which keyX hashes, then the requesting entity 104 searches for the hash record in the next bucket.

According to one embodiment, the hash table entries are stored contiguously within cache 110. In such an embodiment, the initial for-location-access-operation may retrieve both (a) the entry that corresponds to the bucket to which the key value hashes, and (b) the entry for the next bucket. In such an embodiment, if the entry to which the key hashes does not have a matching hash record, then the hash record can be obtained from the following entry without the need to issue an additional for-location-access-operation. In other words, both the buddy buckets can be read in a single RDMA read operation and then the requesting entity can locally figure out which bucket has the key it is looking for.

In one embodiment, when building the hash table 112, if there is insufficient space to store the hash record for a row in either the bucket to which the row's key hashes, or in the bucket that follows that bucket, then no hash record for that row is created. In such and embodiment, when the requesting entity 104 is unable to find the hash record for a key value in either the bucket to which the key value hashes, or the next bucket, the requesting entity 104 obtains the row using conventional interaction with the database server instance 108.

In one embodiment, the database server instance tracks how many times hash records do not fit their corresponding bucket or the next bucket. If the number exceeds a threshold, then the hash table is dynamically resized to include a larger number of buckets (which may require an increase in the number bits used as bucket-identifying bits). In one embodiment, a larger hash table is built if the hash records of any rows do not fit in the corresponding bucket or the next bucket. Such an embodiment ensures that a hash record for every row will always be present in the hash table.

The Hash Record

As mentioned above, a "hash record" is the information stored in a hash table entry for a particular key value. In the case where the hash table is used for facilitating RDMA of cached rows, each hash record includes information for locating a row that has a key value that hashes to the bucket that contains hash record. In such an embodiment, the hash record for a row may include, for example:

a "tag" (2 bytes)
rdba (4 bytes): an on-disk block address of the disk block containing the row
objd (4 bytes): an identifier of the database object (e.g. emp table 300) that contains the row. Each object/table in the database has a unique objd.
block# (4 bytes): the number of the in-memory block (e.g. block 408) within the region of cache 110 that is storing the cached data 114
slot# (2 bytes): the slot number of the row within the in-memory block.

How each of these pieces of information are used during the RDMA retrieval process is described in detail hereafter.

Using Tags to Identify the Correct Hash Record

The "tag" that is stored in the hash record of a row is used to identify the correct hash record when the unique keys of multiple rows hash to the same bucket. The tag for a row may be bits extracted from the hash value produced by the row's key value. For example, assume that hash table 112 has 16 buckets. Under this assumption, only four bits of the hash value are used as bucket-identifying bits. If the hash value produced by the hash function is larger than four bits, then some of those additional bits may be used as the "tag" for the row. According to an embodiment, the hash function used to generate hash values produces hash values that are large enough to include both bits for identifying a bucket and bits that serve as tags to resolve collisions. In one embodiment, the hash values thus generated are 64 bits in size.

For the purpose of illustration, assume that the hash value produced by 123-45-6789 is 0110010000, and that the hash value produced by 999-99-9999 is 1010110000. In this case, if the last four bits are used as bucket-identifying bits, then both key values will hash to the bucket that corresponds to "0000" (e.g. bucket 302). However, if bits three through six are used as the tag, then within the hash table entry for bucket 302 (i.e. entry 310) the hash record for row 352 will have tag "1001" and the hash record for row 356 will have tag "1011".

In this example, four bits are used as the bucket-identifying bits, and four bits are used as the tag. However, the actual number of bits used for each purpose may vary from implementation to implementation. According to an embodiment, each hash value is 8 bytes and a tag is two bytes of the hash value. Initially, it is preferable for the tag to not include any of the bits of the hash value that are used to identify the hash bucket (the "bucket-identifying bits").

As mentioned above, the tag is used to resolve "collisions" when a hash table entry includes hash records for multiple key values. For example, rows 352 and 356 have key values that produce different hash values, however the bucket-identifying bits of those hash values are the same. Consequently, as illustrated in FIG. 4, hash records for both rows are stored in entry 310.

When trying to retrieve the row associated with the key 123-45-6789, the requesting entity 104 needs to determine which of the two hash records is the right one for that key value. Even though multiple keys hash to the same bucket, it is highly likely that the bits of the hash values that are used as tags are different. Therefore, the requesting entity 104 may find the hash record for the key value 123-45-6789 by selecting the hash record within entry 310 has a tag that matches the tag produced by the hash of the key value 123-45-6789. In the example given above, the hash record that has the tag "1100" would be selected, because those are the tag byte(s) of the hash value produced by 123-45-6789.

It should be noted that even matching tags do not guarantee that a particular hash record is the right hash record for a given key value, because it is possible for different unique keys to produce both the same bucket-identifying bits and the same tag byte(s). Therefore, even when the tag produced by the hash of a key value matches the tag of a particular hash record, the requesting entity 104 has to verify, after a row has been obtained through RDMA, that the row has a key value that matches the key value specified for the target data.

For example, in response to the command "SELECT name FROM emp WHERE ssn=123-45-6789", the requesting entity 104 uses the hash of 123-45-6789 to pick a bucket, and then uses RDMA to retrieve the bucket data for that bucket (entry 310) from hash table 112. The requesting entity 104 then uses the tag bit produced by the hash of 123-45-6789 to pick, within the bucket data, a hash record that matches the tag. Requesting entity 104 then uses the hash record to perform a for-data-access-operation to retrieve the row that corresponds to that hash record. Once that row is retrieved, requesting entity 104 compares the key value stored in the retrieved row with 123-45-6789 to ensure that the right row was retrieved.

In cases where the key value of the retrieved row is not identical to the key value designated for the target data, the requesting entity 104 may have to issue additional RDMA requests (e.g. if other hash records in the same bucket also match the tag). Alternatively, the requesting entity 104 may obtain the target data through conventional interaction with database server instance 108. In one embodiment, when multiple hash records, in the same bucket, match a key's tag, the requesting entity 104 may issue multiple RDMA's in parallel to retrieve the row data that corresponds to each of the matching hash records. Once the rows are obtained, requesting entity 104 inspects the key values of the retrieved rows to determine which row is the actual target data.

Segmenting the Hash Table

According to an embodiment, hash table 112 is divided into segments and dynamically resized one segment at a time. As shall be described in greater detail hereafter, the segmentation of the hash table allows resizing operations to stop indefinitely when certain conditions are satisfied, even though not all segments have been resized. Thus, resizing operations need only incur as much overhead as necessary to achieve desired conditions, which may be significantly less overhead than would be required to resize all segments of a hash table. Referring to FIG. 5, it is a block diagram that illustrates hash table 112 divided into segments. In the embodiment illustrated in FIG. 5, hash table 112 is divided into two segments 500 and 502. Each of the two segments includes four buckets. Specifically, segment 500 includes buckets 000 to 011, and segment 502 includes buckets 100 to 111. In the illustrated embodiment, each bucket has storage for up to three hash records.

Because hash table 112 has eight total buckets, three bits may be used to uniquely identify any given bucket of hash table 112. For the purpose of explanation, it shall be assumed that the three least significant bits of the hash value produced by a key value are used as the bucket-identifying bits for the key value.

As illustrated in FIG. 5, bucket 000 is currently storing hash records that correspond to keys k1, k2 and k3. Hash records that correspond to keys k4, k5, k6 are stored in bucket 001. Hash records for keys k7, k8 and k9 are stored in bucket 010. A hash record for key k10 is stored in bucket 011. Hash records for keys k11, k12 and k13 are stored in bucket 100. Hash records for keys k14, k15 and k16 are stored in bucket 101. A hash record for key k17 is stored in bucket 110. A hash record for key k20 is stored in bucket 111.

Overflow Tracking

As mentioned above, when a key value hashes to a bucket that is already full, a hash record for the key value may be placed in the bucket immediately following the bucket to which the key value hashes. Under these circumstances, a bucket may contain (a) hash records for keys that hashed to the bucket and/or (b) hash records for keys that hashed to the preceding bucket but which overflowed because the preceding bucket was full.

For the purpose of explanation, the bucket to which a given key value hashes shall be referred to herein as the "primary bucket" for the hash record for the key value, and the bucket that follows the primary bucket of a hash record shall be referred to herein as the "secondary bucket" for the hash record. According to one embodiment, each bucket includes metadata that indicates, for each hash record slot in a bucket, whether the bucket is the primary bucket or secondary bucket of the hash record in that slot.

Referring again to FIG. 5, each bucket includes a fourth column for storing metadata associated with the bucket. That metadata includes three overflow-indicating-bits. Each of the three overflow-indicating-bits indicates whether the hash record in the bucket slot that corresponds to the bit is in its primary bucket. For example, for bucket 000, the overflow-indicating bits are 111, which indicates that all three of the hash records in bucket 000 are in their primary bucket. Stated another way, the bucket-identifying bits of the hash values produced by k1, k2 and k3 are 000.

On the other hand, for bucket 001, the overflow-indicating bits are 110. This indicates that bucket 001 is the primary bucket for the first two hash records in bucket 001, and the secondary bucket for the third hash record in bucket 001. Stated another way, hash records that correspond to keys k4, k5 are stored in bucket 001 because the bucket-identifying bits in the hash values produced by those keys are 001. In contrast, the bucket-identifying bits in the hash value produced by k6 are 000. However, bucket 000 was full, so the hash record for k6 was stored in bucket 001.

In a similar manner, the overflow-indicating bits indicate that the hash records for keys k8, k9, k10, k11, k13, k14, k15, k17 and k20 are all in their respective primary buckets. On the other hand, the hash records for keys k7, k12 and k16 are in their respective secondary buckets because their primary buckets were full.

Dynamically Resizing the Hash Table without Blocking

In the embodiment illustrated in FIG. 5, the number of buckets within hash table 112 is dictated by the number of bits used as bucket-identifying bits. Specifically, n bits can be used to index into $2^n$ buckets. Thus, increasing the number of bucket-identifying bits by 1 will double the number of buckets used by hash table 112, and increasing the number of bucket-identifying bits by 2 will quadruple the number of buckets used by hash table 112. Similarly, decreasing the number of bucket-identifying bits by 1 will halve the number of buckets used by hash table 112, and decreasing the number of bucket-identifying bits by 2 will divide by four the number of buckets used by hash table 112.

According to one embodiment, hash table 112 is dynamically resized on a segment-by-segment basis. For the purpose of illustrating a segment-by-segment resizing of hash table 112, it shall be assumed that database server instance 108 has determined that it is encountering too many situations in which both the primary and secondary buckets of newly encountered key values are full. Consequently, database server instance 108 has decided to double the size of hash table 112 by increasing the number of bucket-identifying-bits from 3 to 4. The process of dynamically resizing hash table 112 under these circumstances is described hereafter with reference to FIG. 6.

Figure 6:
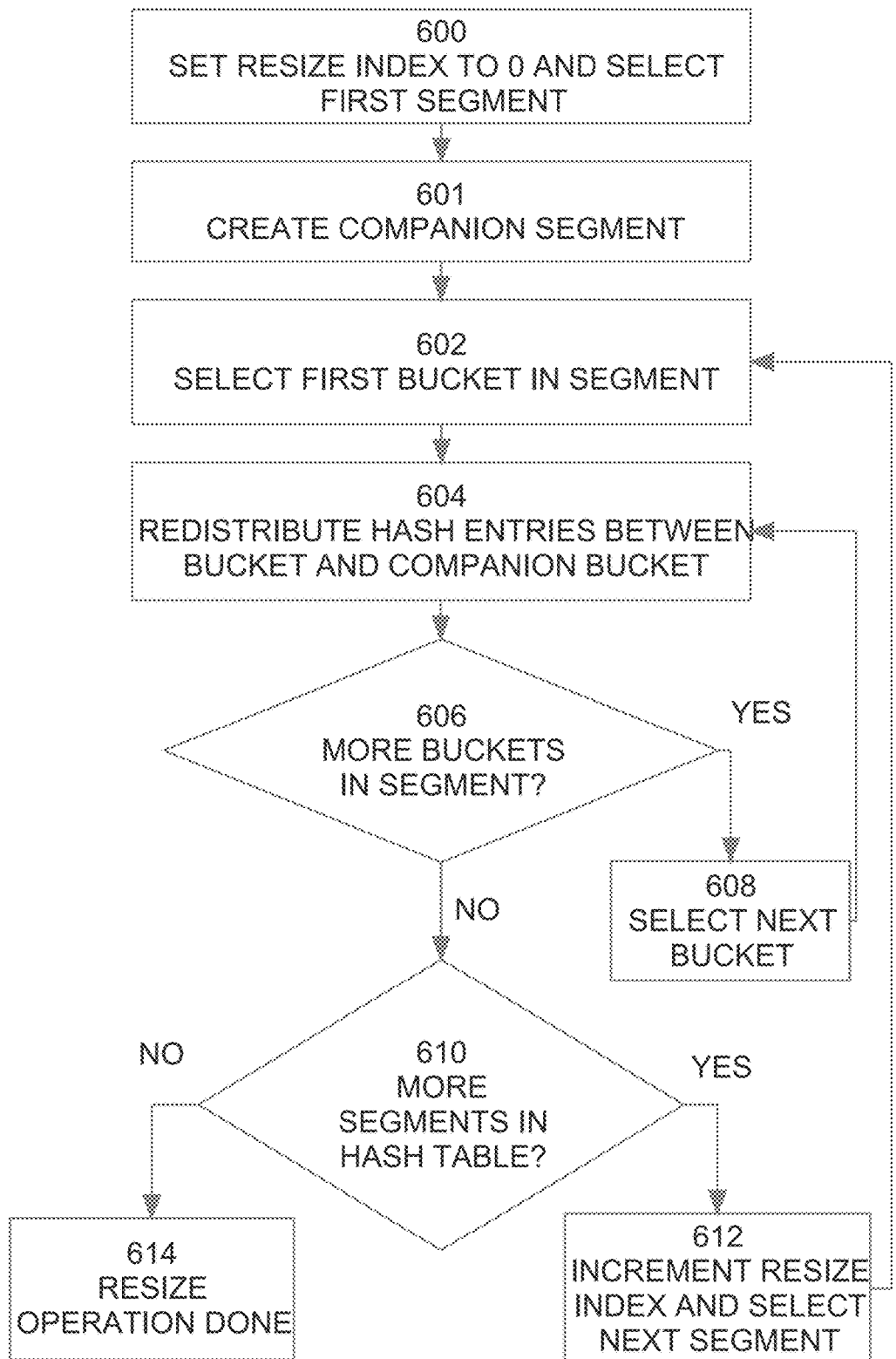
FIG. 6 is a flowchart illustrating steps for dynamically resizing a hash table, according to an embodiment.

Referring to FIG. 6, at step 600 the resizing operation begins by selecting the first segment to resize. According to one embodiment, all resizing operations proceed through the segments sequentially, starting with the first segment (i.e. segment 500). During the resizing operation, a resize index is maintained to keep track of the progress of the resizing operation. Initially, because no segments have yet been resized, the resize index is set to 0.

Figure 7A:
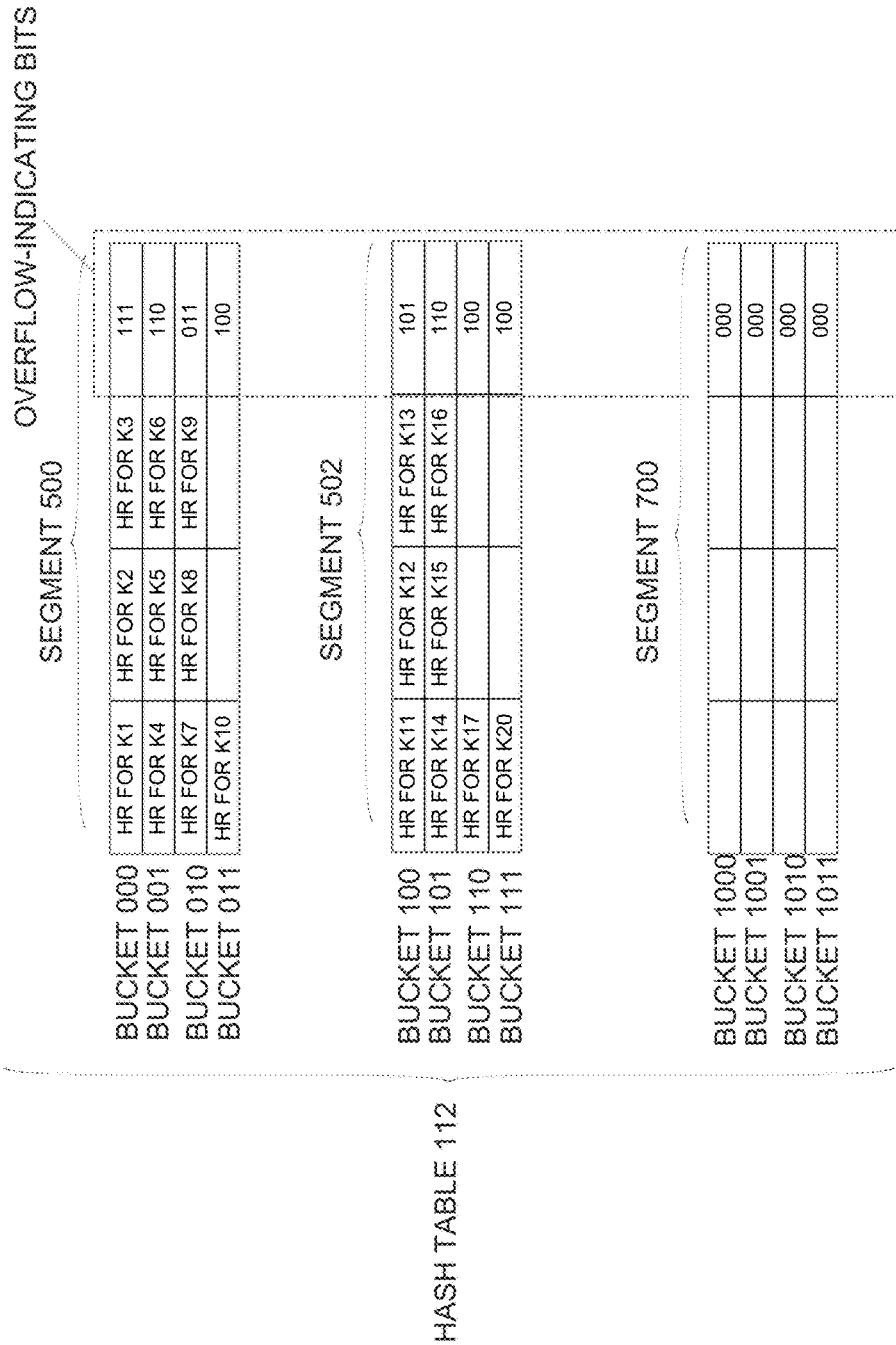
FIG. 7A is a block diagram illustrating a hash table with a newly created companion segment, according to an embodiment.

At step 601, a new "companion segment" is allocated within hash table 112. The companion segment includes a companion bucket for each bucket in the currently-selected segment. FIG. 7A is a block diagram illustrating a companion segment 700 that is created during the resizing of segment 500. Within segment 700, buckets 1000, 1001, 1010 and 1011 are companion buckets for buckets 000, 0001, 010, and 011, respectively. As is evident by this example, the bucket number of each companion bucket has a bit set to "1" followed by the bucket number of the bucket to which it is a companion. That is, the companion bucket of bucket 000 is bucket number 1000, the companion bucket of bucket 001 is 1001, etc.

At step 602, the first bucket in the currently-selected segment is selected for splitting. In the present example, the currently-selected segment is segment 500, and the first bucket in segment 500 is bucket 000. Therefore, in the first iteration of step 602, bucket 000 is selected for splitting.

At step 604, the selected bucket is "split" by redistributing its hash records between itself and its companion bucket. Assuming that M is the number of bucket-identifying bits before the resizing operation, in step 604 the hash entries for any bucket X will be rehashed and redistributed between itself (bucket X) and its companion bucket $(X+2^M)$.

With the addition of companion segment 700 to hash table 112, hash table 112 has more than $(2^M)$ number of buckets. Consequently, when rehashing the hash records of a bucket, M bits are insufficient to index the hash table. Consequently, during the rehashing performed in step 604, the number of bucket-identifying bits is increased by one.

Splitting a Bucket

Figure 8:
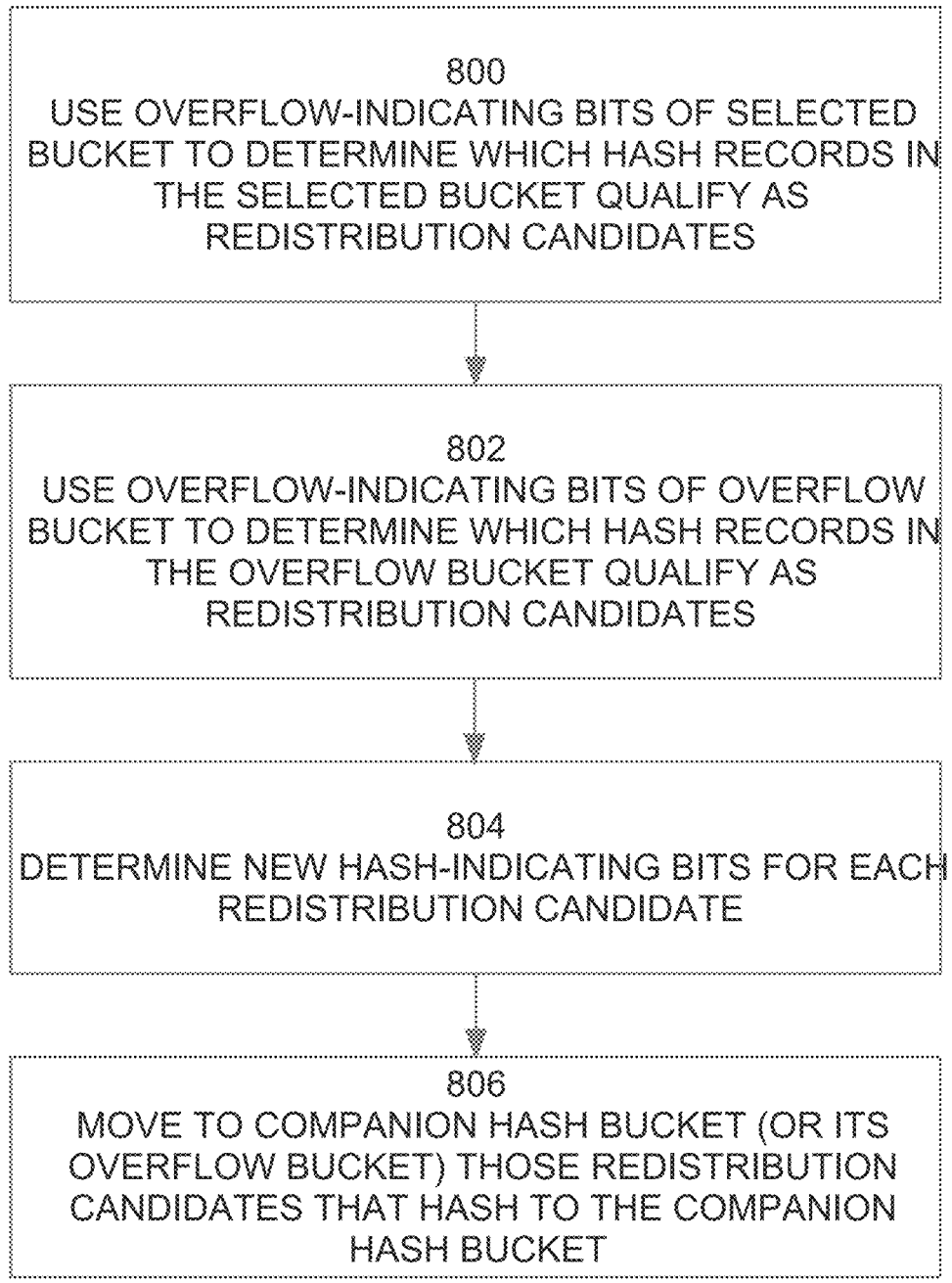
FIG. 8 is a flowchart that illustrates steps for splitting a bucket, according to an embodiment.

As mentioned above, during step 604 a selected bucket is split. Referring to FIG. 8, it is a flowchart that illustrates how a bucket is split, according to an embodiment. At step 800, the overflow-indicating bits of the bucket are inspected to identify the hash records for which the selected bucket is a primary bucket. Those hash records qualify as "redistribution candidates". In the present example, the overflow-indicating bits of bucket 000 are 111, indicating that bucket 000 is the primary bucket for all three hash records in bucket 000. Thus, all three hash records qualify as redistribution candidates.

In step 802, the overflow-indicating bits of the overflow bucket of the selected bucket are inspected. In the present example, the selected bucket is bucket 000, and the overflow bucket for bucket 000 is bucket 001. Therefore, in step 802 the overflow-indicating bits of bucket 001 are inspected to identify hash records for which the bucket 001 is the secondary bucket. The overflow-indicating bits of bucket 001 indicate that bucket 001 is the secondary bucket for the hash record for key K6. Consequently, the hash record for key K6 also qualifies as a redistribution candidate.

Once the redistribution candidates have been identified in steps 800 and 802, new bucket-identifying bits for each redistribution candidate are determined at step 804. In one embodiment, the new bucket-identifying bits for each redistribution candidate are determined by (a) obtaining the key for each redistribution candidate, (b) generating hash values by applying the hash function to each key, and (c) extracting the new number of bucket-identifying bits from the hash values.

Unfortunately, obtaining the new bucket-identifying bits in this manner may involve a significant amount of overhead. Specifically, if the obtaining the key for each redistribution candidate may not be trivial if the key is not in the existing hash record. In the embodiment illustrated in FIG. 4, the hash records do not store the key column values of the corresponding row. In such an embodiment, obtaining the key column values for any given hash record may involve dereferencing a data buffer pointer and extracting the key column values from a cached row. Once the key column values are obtained, there is addition overhead of applying the hash function to the key column values. In an embodiment that stores tags in the hash records, the overhead of obtaining the key column values and applying a hash function to them may be avoided if the tag contains the bit(s) of the hash value that immediately precede the current bucket-indicating bits.

For example, assume that, prior to the resize operation, the three least significant bits are used as the bucket-identifying bits, and that the resizing operation is doubling the size of the hash table by using the four least significant bits as the bucket-identifying bits. Because the redistribution candidates initially mapped to bucket 000, the least significant bits of the hash values produced by the corresponding keys (i.e. k1, k2, k3 and k6) are guaranteed to be 000. Therefore, only one bit is missing to determine the four list significant bits of the hash value produced by these keys.

As mentioned above, the tags that are stored in each hash record are bits extracted from the hash value associated with the hash record. If those bits include the bit that immediately precedes the bucket-identifying bits, then the four least significant bits of the hash value for a hash record may be determined simply by concatenating that bit with the bucket-identifying bits of the bucket that is being split.

For example, when bucket 000 is the bucket that is being split, it is known that the three least significant bits of the redistribution candidates are 000. Consequently, the new four-bit bucket-identifying bits for each hash record in the candidate set may be created by concatenating one bit to the front of 000. For any given hash record in the candidate set, the bit to concatenate to the front of 000 may be extracted from the tag that is stored in the hash record.

For example, assume that the hash value produced by k1 is 0110010000. The last three bits were used as bucket-identifying bits to populate hash table 112 before the split, so k1 hashed to bucket 000 before the split. If bits three through seven are used as the tag, then the hash record for k1 in bucket 000 will store the tag "10010". Since the last bit in this tag is the bit that immediately preceded the bucket-indicating bits, the four least significant bits of the hash value produced by k1 is "0000" ("0" prepended to "000").

As another example, assume that the hash value produced by k2 is 0111111000. The last three bits were used as bucket-identifying bits to populate hash table 112 before the split, so k2 hashed to bucket 000 before the split. If bits three through seven are used as the tag, then the hash record for k2 in bucket 000 will store the tag "11111". Since the last bit in this tag is the bit that immediately preceded the bucket-indicating bits, the four least significant bits of the hash value produced by k1 is "1000" ("1" prepended to "000").

Once new bucket-identifying bits are determined for each redistribution candidate at step 804 (either by regenerating the hash value from the key or by prepending bits from the respective tags), the redistribution candidates are redistributed in step 806. Specifically, any hash records whose new four bucket-identifying bits map to bucket 1000 (the newly-created companion bucket of bucket 000) are moved to bucket 1000 (or if bucket 1000 becomes full, to overflow bucket 1001). Those redistribution candidates whose four-bit bucket-identifying bits are 0000 are not moved to companion bucket 1000.

The redistribution candidates that are not moved to the companion bucket may still be moved within segment 500. For example, assume that, at step 804, it is determined that k1 and k6 hash to 0000, and that k2 and k3 hash to 1000. Under these conditions, the hash records for k2 and k3 are moved to bucket 1000. Moving the hash records for k2 and k2 frees up space in bucket 000 (which, using four bits, is now bucket 0000). Therefore, in addition to moving the hash records for k2 and k3 to bucket 1000, step 806 may involve moving the hash record for k6 into bucket 0000. The overflow-indicating bits of all buckets involved in the split are adjusted appropriately.

Figure 7B:
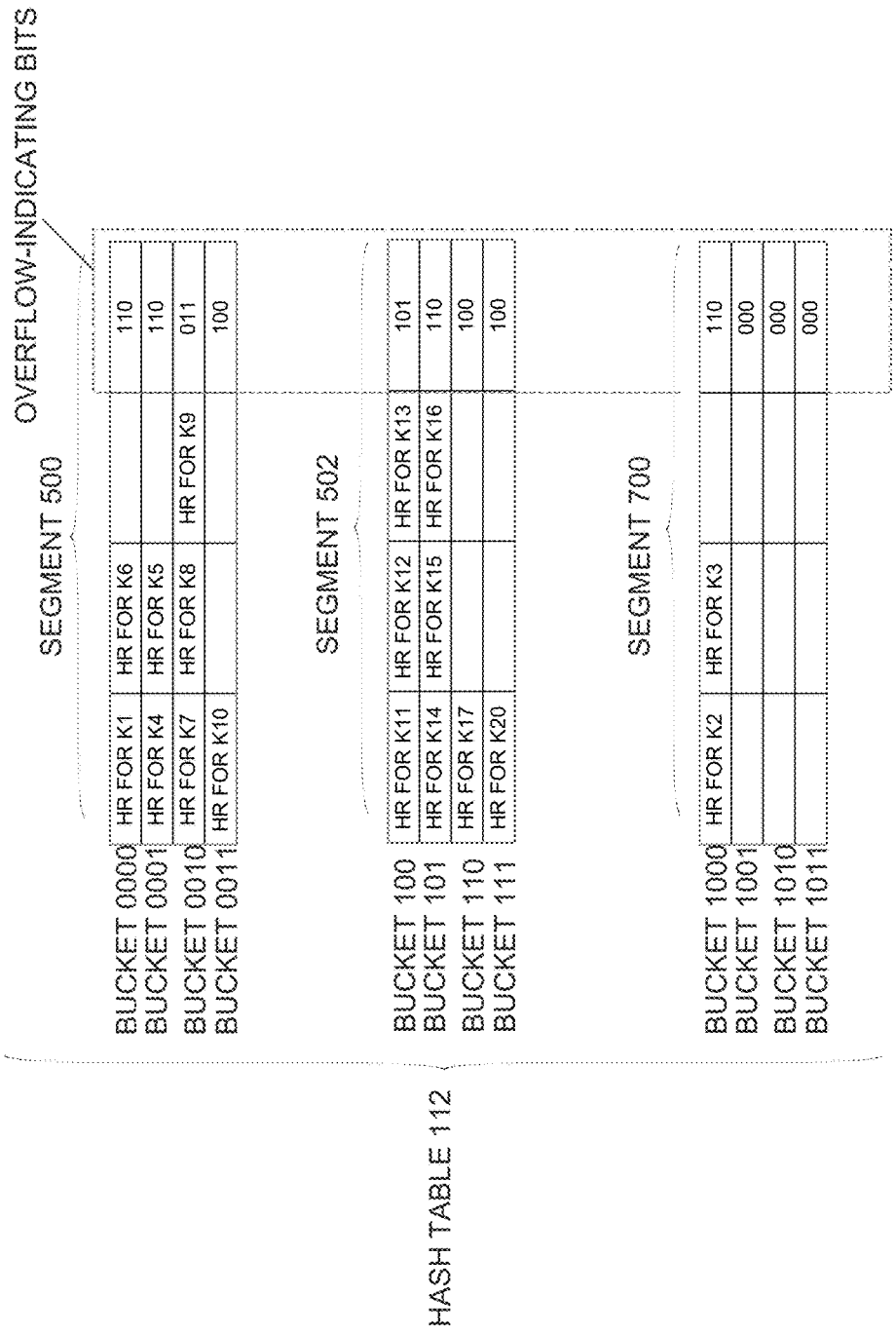
FIG. 7B is a block diagram of a hash table after the split of a bucket, according to an embodiment.

FIG. 7B is a block diagram that illustrates the state of hash table 112 after the split of bucket 000. As illustrated in FIG. 7B, bucket 0000 contains hash records for k1 and k6, and bucket 1000 contains hash records for k2 and k3. The overflow-indicating bits for bucket 0000 indicate that bucket 0000 is the primary bucket for both hash records contained therein. Likewise, the overflow-indicating bits for bucket 1000 indicate that bucket 1000 is the primary bucket for the hash records contained therein.

Figure 7C:
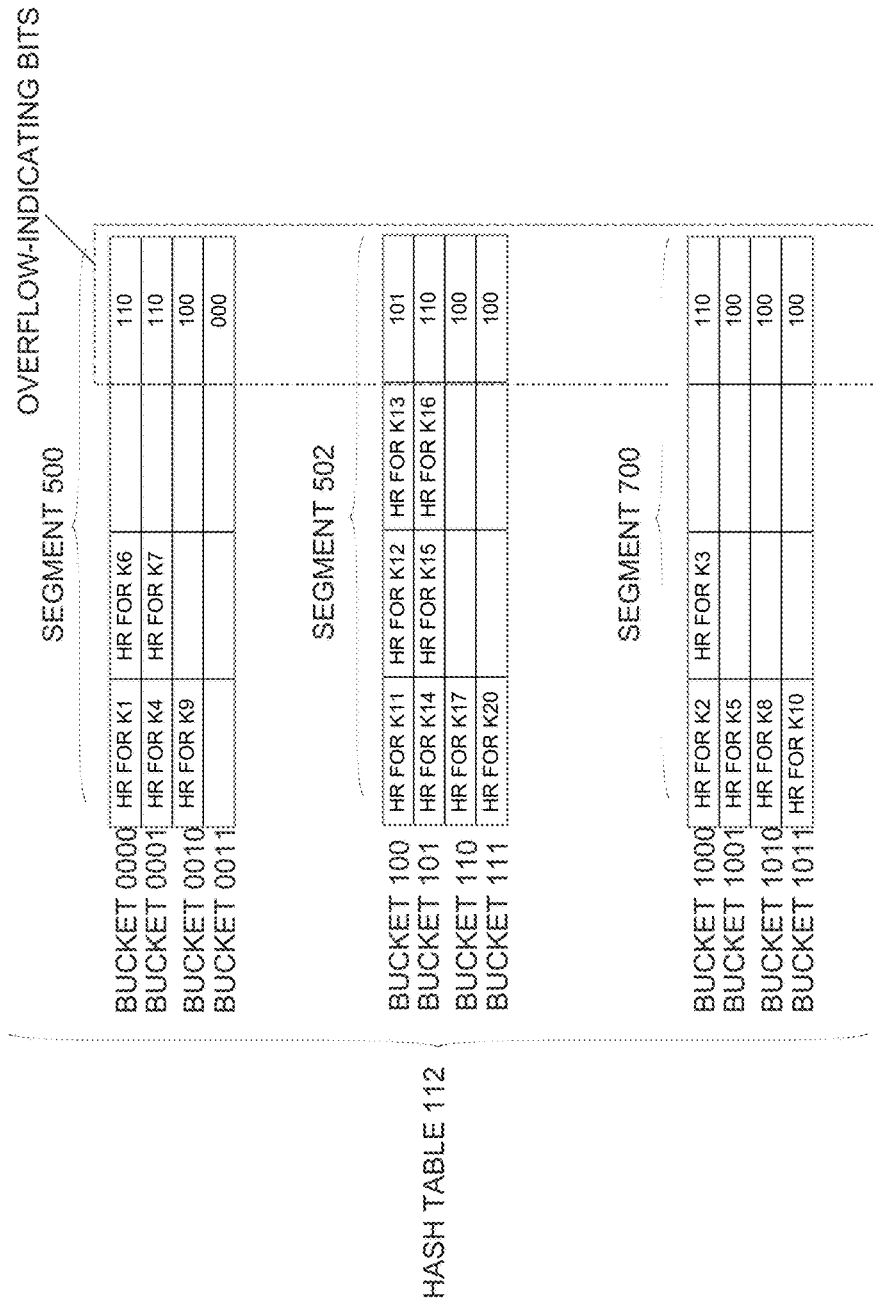
FIG. 7C is a block diagram of a hash table after all buckets in a segment have been split.

Steps 602, 604, 606 and 608 define a loop that causes each bucket within the selected segment to be split in the same manner as has been described with respect to bucket 000. FIG. 7C illustrates how hash table 112 may appear after all buckets of segment 500 have been split. Specifically, before the split of bucket 001, keys k4, k5 and k7 mapped to bucket 001. After the split, bucket 001 becomes bucket 0001 and the hash records for k4 and k7 are in bucket 0001, while the hash record for k5 is in bucket 1001. Before the split of bucket 010, keys k8 and k9 mapped to bucket 010. After the split, bucket 010 becomes bucket 0010 and the hash record for k9 is in bucket 0010, and the hash record for k8 is in bucket 1010. Before the split of bucket 011, k10 mapped to bucket 011. After the split, bucket 011 becomes bucket 0011 and the hash record for k10 is in bucket 1011.

Tracking Split Progress

Returning to FIG. 6, after all buckets in the currently selected segment have been split, database server instance 108 determines at step 610 whether there are more segments in the hash table to process. Steps 602, 610 and 612 form a loop that is repeated for each segment. Specifically, if it is determined at step 610 that more segments need to be processed, control to proceeds to step 612. At step 612, the "resize index" is incremented and the next segment is selected.

As shall be described in greater detail hereafter, in some embodiments, control does not proceed to step 612 automatically. Instead, database server instance 108 first determines whether, due to the addition of the new segment, the load factor of hash table 112 has been reduced sufficiently to fall below a certain threshold. If the load factor of hash table 112 has been reduced sufficiently, then the hash table resize operation halts until the load factor once again rises above the threshold.

The "resize index" is initially set to 0 (step 600) and is incremented upon completion of the processing of each segment of hash table 112 to keep track of the progress of the hash table resize operation. Specifically, the resize index indicates the number of the segment that is currently undergoing bucket splitting. In embodiments where the segments are resized in order, it is guaranteed that all segments with lower segment numbers than the resize index have already been resized, and all segments with higher segment number than the resize index have not yet been resized. Knowing which segments have and have not been resized affects both hash table insert operations, and hash table lookups, as shall be described in detail hereafter.

Insert Operations During Hash Table Resizing

As explained above, when building hash table 112, the database server instance 108 generates a hash value by applying a hash function to a key value, and uses bits from that hash value to determine the bucket of hash table 112 into which the hash record for that key value is to be inserted. When the hash table is undergoing a resizing operation, insert operations proceed in this same manner except that the database server instance 108 must determine, based on the resize index, how many bits of the hash value to use as bucket-identifying bits.

For example, assume that the resizing operation is changing the number of buckets used by the hash table 112 from $2^n$ to $2^m$. In this case, n is the number of bucket-identifying bits before the resize operation, and m is the number of bucket-identifying bits after the resize operation. To insert a hash record during a resizing operation, the database server instance 108 determines the pre-resize (n-bit) bucket number for the key value associated with the hash record. If the pre-resize bucket number is for a bucket that is in a segment for which bucket-splitting has not yet started, then the hash record is simply stored in that bucket (or in its secondary bucket if the primary bucket is full).

On the other hand, if the pre-resize bucket number is for a bucket that is in a segment that has been resized or is currently undergoing bucket splitting, then the post-resize (m-bit) bucket number for the key value associated with the hash bucket is used to pick the bucket into which the hash value is stored.

For example, assume that during the resizing of hash table 112 the database server instance 108 must store a hash record for a key k18. Assume further that the pre-resize 3-bit bucket number produced by the hash of k18 is 011. Bucket 011 is in a segment that is currently undergoing bucket splitting. Therefore, database server instance 108 extracts the post-resize 4-bit bucket number produced by the hash of k18. For the purpose of explanation, it shall be assumed that the 4-bit bucket number produced by k18 is 1011. In this case, the hash record for K18 is stored in bucket 1011.

On the other hand, assume that the pre-resize 3-bit bucket number produced by the hash of k18 is 110. Bucket 110 is in a segment for which bucket splitting has not yet started. Therefore, database server instance 108 stores the hash record for K18 in stored in bucket 110 based on the pre-resize 3-bit bucket number of 110.

Lookup Operations During Hash Table Resizing

Lookup operations performed by requesting entity 104 also take into account whether a key value maps to a bucket in a segment that has undergone resizing. Specifically, after generating the hash value for a particular key value, requesting entity 104 first extracts the pre-resize (n-bit) bucket number from the hash value. If the pre-resize bucket number corresponds to a bucket in a segment for which bucket-splitting has been completed, then the requesting entity 104 uses the post-resize (m-bit) bucket number to look up the hash record for the key value. Otherwise, the requesting entity 104 uses the pre-resize bucket number to look up the hash record for the key.

As mentioned above, the post-resize bucket number is used for lookup operations only when the pre-resize bucket number corresponds to a bucket in a segment for which bucket-splitting has been completed. In such an embodiment, requesting entity 104 uses the pre-resize bucket number even when the bucket identified by the pre-resize bucket number belongs to a segment that is currently undergoing bucket splitting. Consequently, it is possible that the hash record for the target key value has already been moved to a companion bucket in the newly created segment. This creates situations where "false negatives" may occur, where the hash table 112 has a record for a key but the requesting entity 103 does not find the hash record.

For example, while segment 500 is undergoing bucket splitting, requesting entity 104 may attempt to look up the hash record for k8 after that hash record has been moved to bucket 1010. Under these conditions, the requesting entity 104 will not find the hash record for k8 in bucket 010 of hash table 112, and will have to obtain the desired information in some other manner. For example, requesting entity 104 may simply request the desired information by interacting with database server instance 108 in the conventional manner.

Segment Granularity

According to one embodiment, the resize index is communicated to all entities that use hash table 112 every time the bucket splitting of a segment is complete. Therefore, the false negatives mentioned above only happen when a lookup is performed on a bucket in the segment that is currently undergoing bucket splitting. The fewer buckets in that segment, the less likely that false negatives will be encountered. However, the fewer buckets per segment, the more frequently the resize index has to be communicated to requesting entities. Therefore, there is a trade-off between false negative reduction and inter-entity traffic.

For example, in the extreme case, each segment may be a single bucket. Under these circumstances, the resize index is incremented and communicated to all entities that use hash table 112 after each bucket is split. In this case, false negatives would only be produced when a lookup is performed on a key value that happens to map exactly to the one bucket that is currently being split.

As the other extreme, the entire hash table may be treated as a single segment. Under these conditions, the entities that use hash table 112 may be completely unaware that the hash table is undergoing a resize operation until the entire resize operation is completed. In this case, the fact that the hash table was resized needs only be communicated once to the entities that are using the hash table. However, prior to completion of the resizing operation, those entities are likely going to experience many false negatives during their lookup operations.

Communicating the Resize Index

As mentioned above, the resize index must be communicated to requesting entities in order for those requesting entities to know whether the hash value maps to a bucket in a segment for which resizing has been completed. If the hash value maps to a bucket in a segment for which resizing has been completed, then the requesting entity uses the post-resize number of bucket-identifying bits. Otherwise, the requesting entity used the pre-resize number of bucket-identifying bits.

The manner by which the resize index is communicated to the entities that make use of hash table 112 may vary from implementation to implementation and the hashing scheme described herein is not limited to any particular manner of communication. For example, for entities that are executing on the server machine 102, those entities may simply read the resize index directly from local memory prior to performing any lookup operation. Alternatively, the database server instance 108 may communicate the resize index to those local entities every time the resize index changes.

Database server instance 108 may also communicate the resize index to remotely executing entities every time the index changes, however such remote communications involves more overhead. Alternatively, the location of the resize index may be published to the remote entities, and those remote entities may use RDMA to periodically poll the current resize value. The polling interval used by the remote entities may be based on the frequency with which the hash table has been resized in the past: the less frequent the resizing has been (based on historical data relating to past resize operations), the longer the intervals between the RDMA retrieval by remote entities of the resize index.

Incremental Resize Operations

As illustrated in FIG. 6, at step 614 the resize will finish when the database server instance 108 has processed all segments (and therefore split all the original buckets). In the example shown in FIG. 7, resize will complete when all the original 8 buckets are split and thus the hash table will have 16 buckets (8 buckets from 2 original segments 8 new buckets from 2 new segments). However, as long as the state of resize operation is maintained correctly, there is no need to complete the full round of resizing up front.

Specifically, as mentioned earlier, bucket splitting is performed segment by segment. Consequently, it is quite possible that load factor of hash table 112 comes under an acceptable threshold before the entire hash table 112 has been resized. When such is the case, the hash table resizing operation may be paused until conditions change.

For example, assume that the load factor of hash table 112 (ratio of number of keys to number of slots in the hash table) is 75% (18 keys and 24 slots in 2 segments). After allocating the new segment 700, the load factor goes down to 50% (18 keys in 36 slots). As long as the load factor stays below some threshold (e.g. 60%), the resizing of hash table 112 may pause without proceeding to create a companion segment for segment 502.

At some later point in time, enough new entries may be inserted into table 112 to cause the load factor of hash table 112 to exceed the 60% threshold. Exceeding the threshold may trigger the resumption of the resizing operation. When the resizing operation resumes, a new companion segment will be allocated for segment 502, and the buckets within segment 502 will be split in the manner described above relative to segment 500.

Block Numbers

The block# that is contained in a hash record is used by the requesting entity 104 to determine the virtual address of the in-memory block that contains the row for which the hash record was created. Specifically, the requesting entity 104 causes the block# to be translated to a virtual memory address, and then sends the for-data-access-operation to retrieve the block located at that virtual address. In one embodiment, requesting entity 104 translates from block number to virtual memory address using a block-to-address map that was included in the RDMA access information set to requesting entity 104 by database server instance 108. As used herein, "virtual memory address" refers to the address form that is used by remote entities to perform RDMA operations. That address form may vary based on the underlying network fabric used to facilitate the RDMA communications.

Using block# in this manner is an optimization that makes hash table 112 more space efficient. In alternative embodiment, instead of block#, the virtual address itself is stored in hash record. However, in such an embodiment, the size of each hash record would increase, since a virtual address is 8 bytes whereas a block# is only 4 bytes. The larger the size row record locator, the lesser the number of records that can be packed into a single bucket and thus the higher the probability of a sub-optimal lookup performance.

Using the RDBA to Validate a Block

As mentioned above, the block number is translated into a virtual address that is used to retrieve the block containing the target data. However, there are circumstances where that virtual address causes retrieval of the wrong block. Specifically, the virtual address may retrieve the wrong block if, for example, the block that contains the row has been shifted away from its initial address, or the table containing the row has been dropped.

To address this situation, each hash record also includes the on-disk block address (rdba) of the disk block containing the row for which the hash record was created. When requesting entity 104 retrieves block data from cache 110 using RDMA, the requesting entity 104 compares the rdba stored in the hash record with the rdba stored in the header of the retrieved block data. If the rdbas do not match, then an error has occurred and the requesting entity 104 initiates remedial measures. Requesting entity may, for example, resubmit the initial request to database server instance 108 to obtain the target data through conventional means.

Object Identifiers

As mentioned above, the hash records also include an identifier of the database object (e.g. emp table 300) that contains the row (objd). The objd is primarily used for clean up of hash table 112. For example, assume that a table with objd=5 is changed from FAST-LOOKUP-OPTIMIZED to not FAST-LOOKUP-OPTIMIZED Under these circumstances, the hash records within hash table 112 are no longer useful. Therefore, to clean out those entries, database server instance 108 scans hash table 112 and deletes (or marks as deleted) all hash records where objd=5.

Object identifiers may also be used to validate block data in combination with the rdba, described above. For example, in embodiments where the rdba is not unique, but the combination of rdba and objd is unique, both values must match the information in the hash record to ensure that the correct block has been retrieved. Specifically, in such an embodiment, when requesting entity 104 retrieves block data from cache 110 using RDMA, the requesting entity 104 compares both the rdba and the object identifier stored in the hash record with the rdba and the object identifier stored in the header of the retrieved block data. If the values do not match, then an error has occurred and the requesting entity 104 initiates remedial measures.

Slot Numbers

The slot# is used to locate the target data within a block once the block containing the target data is retrieved by the requesting entity 104 using a for-data-access-operation. For example, assume that rows 352, 354, 356 and 358 are the first four rows in block 408, and that they are stored within block 408 in that order. Under these circumstances, rows 352, 354, 356 and 358 respectively correspond to slots 0, 1, 2 and 3 of block 408.

After obtaining the data of block 408 using a for-data-access-operation, requesting entity 104 locates row 352 within the block data based on the fact that the hash record for row 352 indicates slot#0. For example, in one embodiment, the header of block 408 will indicate the actual offset, within block 408, for each slot number. The slot number is used to determine the offset, and the offset is used to extract the row. Thus, because requesting entity 104 has the slot number of the row from the hash record for the row, requesting entity 104 need not scan through the entire data block (which may be, for example 8K bytes of data) to locate the row that matches the specified key value.

The RDMA Access Information

As mentioned above, RDMA access information is provided to requesting entity 104 to enable requesting entity 104 to access data in the volatile memory 106 of machine 102 using RDMA. According to one embodiment, the RDMA access information thus provided includes the hash function used by hash table 112, one or more RDMA-authorization keys, and information about the regions of volatile memory 106 for which RDMA is allowed.

The regions of volatile memory 106 for which RDMA is allowed include the region(s) storing hash table 112 and the regions(s) storing the cached data 114. The information about the regions may include, for example, the base address of hash table 12, the size of hash table 112, a bucket-number-to-virtual-address mapping and a block-number-to-virtual-address mapping. The bucket-number-to-virtual-address mapping indicates the virtual address of the hash table entry of each bucket and is used to get the address of the bucket for the for-location-access-operation. The block-number-to-virtual-address mapping indicates the virtual address of each cached block and is used to get the address of the block for the for-data RDMA. Rather than include the entire mappings in the RDMA access information, the RDMA access information may include information from which the mappings may be derived. For example, the RDMA access information may include a starting address and offsets from the starting address, rather than a full virtual address for each block number.

The RDMA-authorization keys are keys that authorize the requesting entity 104 to obtain information from server machine 102 using RDMA. Without the proper RDMA-authorization key, requesting entity 104 cannot access volatile memory 106 using RDMA. According to an embodiment, database server instance 108 only provides the RDMA-authorization key to requesting entity 104 after requesting entity has proven that requesting entity 104 can be trusted. Such proof may come in many forms, including but not limited to providing appropriate username/password information to database server instance 108.

Making the Network Interface Controller RDMA-Aware

In addition to transferring the RDMA access information to requesting entity 104, the preliminary steps for enabling RDMA access may also include database server instance 108 providing certain information to a network interface card (NIC) through which server machine 102 is coupled to a network. Specifically, according to an embodiment, database server instance 108 registers with its NIC which regions of volatile memory 106 are amenable to RDMA access. According to one embodiment, in response to the RDMA registration, the NIC provides the one or more authentication keys to the database server instance 108. As mentioned above, these keys are eventually provided to the requesting entity 104 so that requesting entity 104 can prove that it is authorized when making an RDMA access to volatile memory 106.

Determining the Location of the Bucket

For a given key-based query, the requesting entity 104 locally does a hash computation on the key and figures out which hash bucket to read from volatile memory 106. Specifically, the requesting entity 104 determines the bucket number based on some of the bits of the hash value produced by applying the hash function to the key. The bits in of the hash value that are used to determine the bucket number are referred to herein as the "bucket-number-bits".

Based on the hash bucket number indicated by the bucket-number-bits, the requesting entity 104 uses the bucket-number-to-address mapping to determine the address of the hash table entry associated with that bucket number. The requesting entity 104 then issues the appropriate for-location-access-operation read request (starting address of read, size of read) for the bucket data from the hash table entry that corresponds to the hash bucket. As shall be discussed in detail elsewhere, in some embodiments the for-location RDMA may read more than one bucket to account for the fact that the desired hash table entry may have overflowed into a subsequent bucket.

According to an embodiment, each entry of hash table 112 is aligned on CPU cache line boundary (64 bytes in size). Aligning the hash table entries in this manner results in atomicity, as RDMA reads on the granularity of CPU cache line are always atomic.

According to one embodiment, the closed addressing based hashing scheme described herein is used to ensure that there are no overflow bucket chains. The lookup on the hash index for a given key K is a constant time operation because there can be only two candidate buckets that can store the key K. The constant lookup time is a result of the strategy of not storing a hash entry at all if neither the target bucket of the bucket that follows the target bucket are too full to store the entry. As a result of this strategy, embodiments that read one bucket at a time will never have more than two for-location RDMAs, and embodiments that read two buckets at a time will never have more than one for-location RDMA.

If the key is not there in any of the candidate buckets, it is guaranteed to be not in the hash index at all. The first candidate bucket is the result of local hash computation by the requesting entity 104. The requesting entity 104 issues an RDMA read on this bucket. If the key is not present (no key identifier matches) in the bucket, requesting entity 104 issues second RDMA read on the next candidate bucket. The second candidate bucket is adjacent to the first candidate bucket and it is straightforward to compute the address of the former from the latter.

A local requesting entity, such as requesting entity 120, would operation in a similar manner. However, rather than using RDMA to read buckets of hash table 112, requesting entity 120 simply accesses the memory directly.

Determining the Location of the Target Data

According to one embodiment, once the hash bucket (which may be 64 bytes) is transported to requesting entity 104, requesting entity 104 interprets the contents of bucket and, based on the contents of the bucket determines the location of the target data. In the present example, the target data is the value in the actual COLUMN (e.g. "name") that was mentioned in the SELECT query. The bucket data has meta-data to indicate if it is in flux (was under concurrent modification on server). If the bucket is in flux, requesting entity 104 discards the bucket and retries the for-location-access-operation. Consequently, the for-location-access-operations, whether made using RDMA or not, constitute latchless reads. Instead of retrying the for-location-access-operation, requesting entity 104 can decide to use the conventional way of issuing queries to RDBMS. The mechanism for identifying in-flux data shall be described in greater detail hereafter.

Non-Unique Key Embodiments

In the embodiments described above, it was assumed that fast lookups using hash table 112 are performed only when the request is for a single row that matches a unique key value. However, in alternative embodiments, the key used to identify matching data may be non-unique. Because the keys are non-unique any number of rows may match a given key value. Thus, each hash record may include location data for any number of rows. The retrieval of each of the rows may be made by performing for-data-access-operations, for each row, in the manner described above.

If the number of for-data-access-operations needed to retrieve all of the rows that match a particular key value are higher than a particular threshold, then it would have been more efficient to simply request the data from the database server instance 108 in the conventional manner. Therefore, according to one embodiment, database server instance 108 only populates hash table 112 with hash records that correspond to key values that match fewer than the threshold number of rows. When database server instance 108 parses and compiles a database command that specifies a key that matched more than the threshold number of rows at the time the hash table was created for the table, the database server instance 108 informs the requesting entity 104 that the command is not eligible for fast lookup.

In an alternative non-unique key embodiment, separate hash records may be stored for every row that matches a given key. If the bucket to which a key hashes does not have enough room for all hash records, the hash records can be stored in the next bucket. If there is no room in the next bucket, hash records may not be stored at all, or conventional hash table overflow techniques may be used. For example, additional memory space for storing hash records for a bucket may be chained to the hash table entry of the bucket. To ensure rows that have the given key are retrieved, the requesting entity issues access operations to "walk the chain" to retrieve all applicable hash records, and then performed for-data-access-operations to retrieve all matching rows.

Latchless Reads on Hash Index Buckets

It is possible that a bucket in hash table 112 is currently undergoing a modification at the time the bucket data is retrieved by a requesting entity. Buckets that are undergoing modifications when they are accessed are referred to herein as "in-flux" buckets. According to one embodiment, to prevent in-flux reads on a bucket (hash index), the process that is updating the hash index (the "writer") uses a fine-grained spin lock implemented as indicated by the following logic:

```
while(TRUE)
{
    /* read the location of 8 byte version from bucket */
    memory address = &(bucket_version);
    /* read the value of version -- this is a volatile read */
    version = *(memory_address);
    if(version & 1)
    {
        /* version is odd and some writer is already in progress so
         * this writer will wait
         */
    }
    else
    {
        if(Compare_And_Swap(memory_address, version, version + 1)
        {
            /* atomically bumped the version and made it odd.
             * this writer got the lock
             */
            return TRUE;
        }
    }
}
```

As indicated by this logic, the writer first reads the location of the version information, and then reads the version itself. If the version is odd, then some other writer is accessing the bucket and the writer must wait (repeating the steps of reading the version number and determining whether it is odd). As soon as the writer detects that the version is even, the writer atomically increments the version number. At this point, the writer effectively has a lock and can proceed with the update to the bucket.

To prevent in-flux reads of hash table buckets by a local requesting entity, the local requesting entity reads the version of the bucket, reads the bucket, and reads the version of the bucket again. If both the versions match and are even, then the bucket was not in-flux and the information contained therein can be trusted and used. Otherwise, the local requesting entity retries the operation.

For requesting entities that are accessing hash table 112 using RDMA, once the requesting entity retrieves the bucket via RDMA and sees an odd version, it discards the read and retries. There is no need to do pipelined RDMA operations for the bucket of the hash index.

Latchless Reads on Data in Blocks

Database server instance 108 keeps cached data 114 up to date so that for-data-access-operations on cached data 114 retrieve the latest version of the data items. However, it is possible that the latest version of a data item contains uncommitted data. In addition, similar to buckets, it is possible for data items to be "in-flux" at the time they are accessed. Because the state of the in-flux data items is changing, it is preferable that the requesting entity 104 avoid using data that was obtained while in-flux.

To prevent the use of in-flux data, each block has a version number. Whenever database server instance 108 modifies a block, database server instance 108 first increments a version number maintained for the block (either in the block or elsewhere). After modifying the block, the database server instance 108 increments the version number again. Because the version number is incremented before and after a change, the version number will either (a) always be even when the block is in-flux, or (b) always be odd when the block is in flux. For the purpose of illustration, it shall be assumed that the version number is always odd when the block is in flux.

To detect situations where retrieved data is in-flux, the requesting entity 104 may send three pipelined RDMA requests. Because they are pipelined, the three RDMA requests are performed sequentially. The first and third requests are RDMA requests to read the block's version number, while the second RDMA request is to obtain the block itself. Using this technique, the requesting entity 104 can be assured that the block was not in-flux when (a) the block version numbers retrieved by the first and third requests match, and (b) the block version numbers are even. If the version numbers retrieved by the first and third requests do not match or are odd, then remedial measures are taken. In this context, remedial measures may simply be to send the three pipelined RDMA requests again.

Even when a requesting entity determines that a retrieved block was not in-flux, the data that the requesting entity needs from the block may include uncommitted changes. Based on transaction information maintained in the block, the requesting entity determines whether the data required from the block includes uncommitted changes. If the block was not in-flux and the data does not include uncommitted changes, then the requesting entity may use the data obtained from the block. Otherwise, the requesting entity requests the data through conventional interaction with database server instance 108.

Local requesting entities, such as requesting entity 120, also need to ensure that the data they obtain using fast lookups was not in-flux. Such local requesting entities also use block version numbers to make this determination in a manner similar to non-local entities. However, the local entities obtain the data they require through direct memory reads rather than RDMA operations.

The Underlying Network Fabric

The RDMA techniques described herein assume an underlying network fabric to allow data transfers between the requesting entity 104 and the server machine whose volatile memory stores the cached data. Such an underlying network fabric may be, for example, an Infiniband Interconnect. However, the techniques described herein are not limited to any particular underlying network fabric.

Alternative Hash Table Embodiments

Embodiments of hash table 112 have been described herein where hash records are stored in a primary bucket if there is room, in a secondary bucket if the primary bucket is full, and are not stored in the hash table at all if both the primary bucket and the secondary bucket are full. However, in alternative embodiments, any number of secondary buckets may be used. The larger the number of secondary buckets, the greater the likelihood that there will be room in the hash table for a hash record. However, increasing the number of secondary buckets also increases the number of buckets that may have to be scanned during a lookup operation. When RDMA is used to retrieve the buckets, increasing the number of secondary buckets may result in either a higher number of RDMA operations (to retrieve additional secondary buckets if not found in the first secondary bucket), or increasing the amount of data retrieved in the RDMA operations (thereby increasing inter-connect traffic).

The hashing scheme used herein may also be used outside the context of a database system. Specifically, the requesting entities may be any entities that need to look up information based on keys, and the entity that builds and maintains the hash table may be any type of software application. As long as the requesting entities have a way to obtain the information in some other way, the hashing scheme described herein may be used even though the hash table may produce false negatives.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
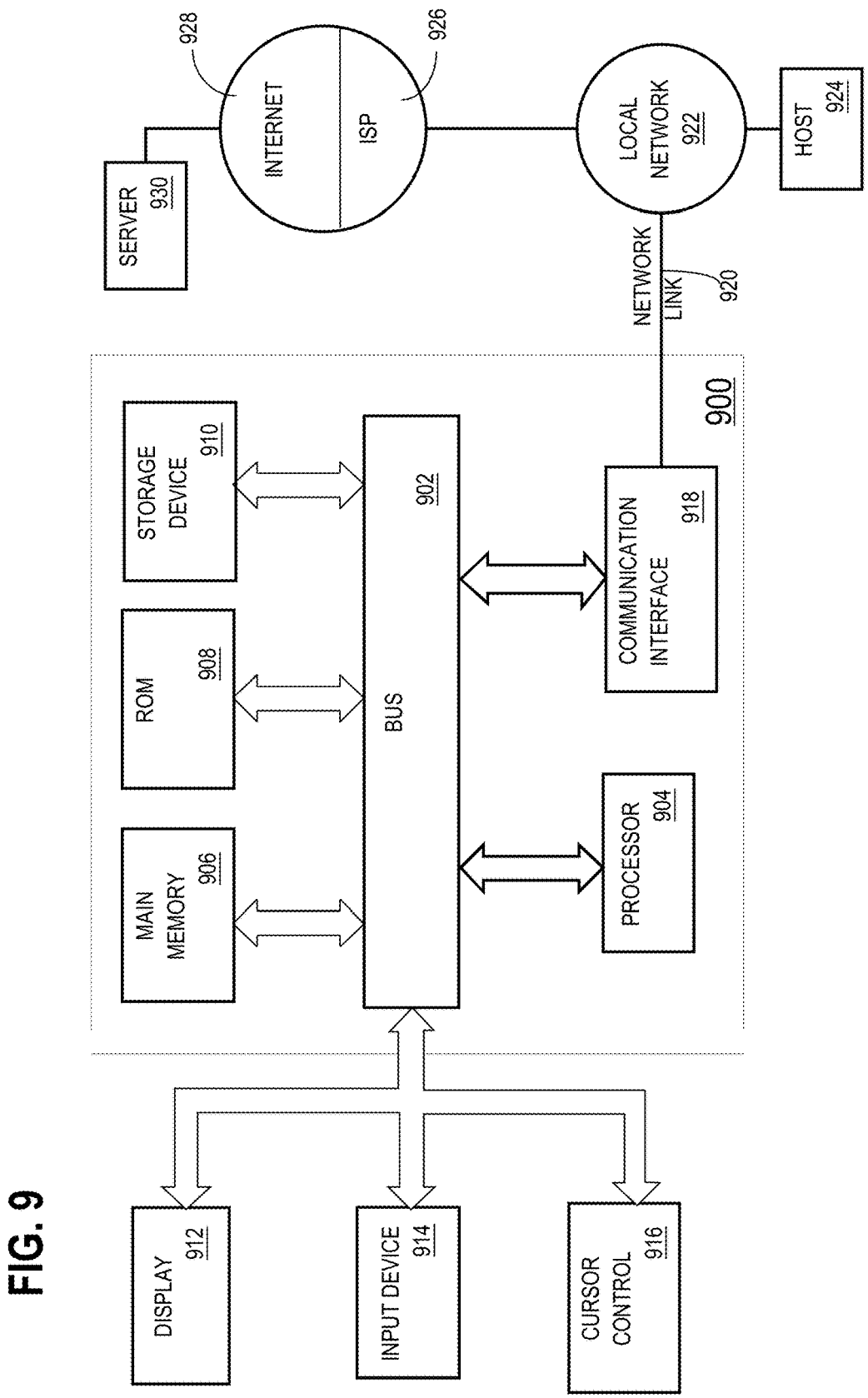
FIG. 9 is a block diagram of a computer system upon which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   organizing a hash table into a plurality of segments, wherein each segment of the plurality of segments includes a set of buckets;
   inserting hash records into the hash table based on a first number of bucket-identifying bits;
   dynamically resizing the hash table without blocking access to the hash table, wherein dynamically resizing the hash table includes:
      selecting a particular segment of the plurality of segments for resizing;
      adding to the hash table one or more companion segments of the particular segment;
      redistributing hash records from buckets in the particular segment between the particular segment and the one or more companion segments based on a second number of bucket-identifying bits that is different than the first number of bucket-identifying bits;
      determining the second number of bucket-identifying bits for a particular hash record by prepending, to the first number of bucket-identifying bits for the particular hash record, one or more bits from a tag value stored in the particular hash record;
   while dynamically resizing the hash table, allowing one or more requesting entities to continue to perform lookups using the hash table;
   wherein the method is performed by one or more computing devices.

2. The method of claim 1 further comprising:
   using a resize index to track progress of the dynamic resizing of the hash table;
   during dynamic resizing of the hash table, determining that a new hash record for a particular key is to be inserted into the hash table;
   determining, based on the resize index and first number of bucket-identifying bits produced by hashing the particular key, whether to:
      select a target bucket based on the first number of bucket-identifying bits produced by hashing the particular key; or
      select the target bucket based on the second number of bucket-identifying bits produced by hashing the particular key;
   storing the new hash record in the hash table based on the particular key mapping to the target bucket.

3. The method of claim 1 further comprising:
   using a resize index to track progress of the dynamic resizing of the hash table;
   during dynamic resizing of the hash table, a requesting entity performing a lookup based on a particular key by:
      determining, based on the resize index and the first number of bucket-identifying bits produced by hashing the particular key, whether to:
         select a target bucket based on the first number of bucket-identifying bits produced by hashing the particular key; or
         select the target bucket based on the second number of bucket-identifying bits produced by hashing the particular key;
   performing the lookup based on the particular key mapping to the target bucket.

4. A method comprising:
   organizing a hash table into a plurality of segments, wherein each segment of the plurality of segments includes a set of buckets;
   inserting hash records into the hash table based on a first number of bucket-identifying bits;
   dynamically resizing the hash table without blocking access to the hash table, wherein dynamically resizing the hash table includes:
      selecting a particular segment of the plurality of segments for resizing;
      adding to the hash table one or more companion segments of the particular segment;
      redistributing hash records from buckets in the particular segment between the particular segment and the one or more companion segments based on a second number of bucket-identifying bits that is different than the first number of bucket-identifying bits;
   while dynamically resizing the hash table, allowing one or more requesting entities to continue to perform lookups using the hash table;
   wherein the one or more companion segments include companion buckets for the buckets in the particular segment;
   wherein redistributing hash records includes, for each particular bucket in the set of buckets in the particular segment, splitting the bucket by performing the steps of:
      identifying a set of candidate hash records that qualify as redistribution candidates for the particular bucket, wherein the set of candidate hash records that qualify as redistribution candidates for the particular bucket are hash records that correspond to key values that hash to the particular bucket using the first number of bucket-identifying bits;
      for each candidate hash record, determining a target bucket based on the second number of bucket-identifying bits; and
      for those candidate hash records whose target bucket is not the particular bucket, moving the hash records to a bucket in one of the one or more companion segments;
   wherein identifying the set of candidate hash records that qualify as redistribution candidates for the particular bucket includes:
      inspecting overflow-indicating bits maintained for the particular bucket to identify hash records for which the particular bucket is a primary bucket; and
      inspecting overflow-indicating bits maintained for a next bucket that immediately follows the particular bucket to identify hash records for which the next bucket is a secondary bucket.

5. A method comprising:
   organizing a hash table into a plurality of segments, wherein each segment of the plurality of segments includes a set of buckets;
   inserting hash records into the hash table based on a first number of bucket-identifying bits;
   dynamically resizing the hash table without blocking access to the hash table, wherein dynamically resizing the hash table includes:
      selecting a particular segment of the plurality of segments for resizing;
      adding to the hash table one or more companion segments of the particular segment;
      redistributing hash records from buckets in the particular segment between the particular segment and the one or more companion segments based on a second number of bucket-identifying bits that is different than the first number of bucket-identifying bits;

while dynamically resizing the hash table, allowing one or more requesting entities to continue to perform lookups using the hash table;

after some but not all of the plurality of segments have been resized, halting the resizing of the hash table in response to determining that a load factor of the hash table satisfies certain conditions; and resuming the resizing of the hash table responsive to detecting that that the load factor of the hash table ceases to satisfy certain conditions.

6. A method comprising:

organizing a hash table into a plurality of segments, wherein each segment of the plurality of segments includes a set of buckets;

inserting hash records into the hash table based on a first number of bucket-identifying bits;

dynamically resizing the hash table without blocking access to the hash table, wherein dynamically resizing the hash table includes:

selecting a particular segment of the plurality of segments for resizing;

adding to the hash table one or more companion segments of the particular segment;

redistributing hash records from buckets in the particular segment between the particular segment and the one or more companion segments based on a second number of bucket-identifying bits that is different than the first number of bucket-identifying bits;

while dynamically resizing the hash table, allowing one or more requesting entities to continue to perform lookups using the hash table;

when a hash record is to be inserted into the hash table, performing the steps of:

determining a target bucket based on a hash value produced by hashing a key value that corresponds to the hash record;

determining that the target bucket does not have room for the hash record;

responsive to determining that the target bucket does not have room for the hash record, inspecting N buckets that immediately follow the target bucket to find room for the hash record; and responsive to determining that the N buckets that immediately follow the target bucket do not have room for the hash record, not storing the hash record in the hash table.

7. The method of claim 6 where N is 1.

8. The method of claim 6 further comprising storing, for each bucket in the hash table, a set of overflow-indicating bits that indicate, for each hash record in the bucket, whether the bucket is a primary bucket for the hash record.

9. A method comprising:

causing a writer process to perform the following steps prior to updating a bucket in a hash table:
(a) reading metadata for the bucket;
(b) determining whether the metadata satisfies a condition;
repeating (a) and (b) until the metadata satisfies the condition;
once the metadata satisfies the condition, the writer process performing a first update to the metadata to cause the metadata to cease to satisfy the condition;

the writer process updating the bucket after updating the metadata;

after updating the bucket, the writer process performing a second update to the metadata to cause the metadata to satisfy the condition;

allowing a requesting entity to read the bucket without obtaining any latch on the bucket;

before using data from the bucket, the requesting entity determining whether the metadata satisfies the condition; and the requesting entity only using data from the bucket responsive to determining that the metadata satisfies the condition.

10. The method of claim 9 wherein:

the metadata is a version number of the bucket;

performing the first update to the metadata involves incrementing the version number; and performing the second update to the metadata involves incrementing the version number.

11. The method of claim 10 wherein the condition is that the version number is even.

12. The method of claim 9 wherein:

the requesting entity reading the bucket by performing an RDMA operation to retrieve bucket data; and the requesting entity discarding the bucket data responsive to determining that the metadata does not satisfy the condition.

13. A method comprising:

populating a hash table with information associated with a plurality of key values by performing the following steps for each key value of the plurality of key values:

determining a bucket of the hash table based on the key value;

determining whether the bucket has room to store a hash record for the key value;

if the bucket has room for the hash record, then storing the hash record in the bucket;

if the bucket does not have room for the hash record, then checking for room in up to N buckets that immediately follow the bucket;

if one of the N buckets has room for the hash record, then storing the hash record in the one of the N buckets; and if neither the bucket nor any of the N buckets has room for the hash record, then not storing any hash record for the key value in the hash table;

causing a requesting entity to only look for a hash record for a particular key in the bucket of the hash table to which the particular key hashes and the N buckets that immediately follow the bucket to which the particular key hashes;

responsive to the requesting entity not finding any hash bucket for the particular key in the bucket to which the particular key hashes or the N buckets that immediately follow the bucket, the requesting entity obtaining the information associated with the particular key without using the hash table;

wherein N remains constant for all hash record insert operations and all hash record lookup operations involving the hash table; and wherein the method of performed by one or more computing devices.

14. The method of claim 13 wherein:

a database stores the information associated with the particular key; and obtaining the information associated with the particular key without using the hash table includes sending a request to a database server instance that manages the database.

15. The method of claim 14 wherein the step of populating the hash table is performed by the database server instance.

16. The method of claim 13 wherein the requesting entity looks for the hash record for the particular key by performing one or more RDMA operations to read, from a remote volatile memory, the bucket to which the particular key hashes and the N buckets that immediately follow the bucket.

17. The method of claim 16 wherein the requesting entity performs a single RDMA to read both the bucket to which the particular key hashes and the N buckets that immediately follow the bucket.

18. The method of claim 13 further comprising maintaining, for each hash bucket of the hash table, metadata that indicates, for each hash record in the bucket, whether the hash record is for a key value that hashes to the bucket.

19. One or more non-transitory media storing instructions which, when executed by one or more computing devices, cause:
   organizing a hash table into a plurality of segments, wherein each segment of the plurality of segments includes a set of buckets;
   inserting hash records into the hash table based on a first number of bucket-identifying bits;
   dynamically resizing the hash table without blocking access to the hash table, wherein dynamically resizing the hash table includes:
      selecting a particular segment of the plurality of segments for resizing;
      adding to the hash table one or more companion segments of the particular segment;
      redistributing hash records from buckets in the particular segment between the particular segment and the one or more companion segments based on a second number of bucket-identifying bits that is different than the first number of bucket-identifying bits;
      determining the second number of bucket-identifying bits for a particular hash record by prepending, to the first number of bucket-identifying bits for the particular hash record, one or more bits from a tag value stored in the particular hash record;
   while dynamically resizing the hash table, allowing one or more requesting entities to continue to perform lookups using the hash table.

20. One or more non-transitory media storing instructions which, when executed by one or more computing devices, cause:
   causing a writer process to perform the following steps prior to updating a bucket in a hash table:
      (a) reading metadata for the bucket;
      (b) determining whether the metadata satisfies a condition;
      repeating (a) and (b) until the metadata satisfies the condition;
      once the metadata satisfies the condition, the writer process performing a first update to the metadata to cause the metadata to cease to satisfy the condition;
   the writer process updating the bucket after updating the metadata;
   after updating the bucket, the writer process performing a second update to the metadata to cause the metadata to satisfy the condition;
   allowing a requesting entity to read the bucket without obtaining any latch on the bucket;
   before using data from the bucket, the requesting entity determining whether the metadata satisfies the condition; and
   the requesting entity only using data from the bucket responsive to determining that the metadata satisfies the condition.

21. One or more non-transitory media storing instructions which, when executed by one or more computing devices, cause:
   populating a hash table with information associated with a plurality of key values by performing the following steps for each key value of the plurality of key values:
      determining a bucket of the hash table based on the key value;
      determining whether the bucket has room to store a hash record for the key value;
      if the bucket has room for the hash record, then storing the hash record in the bucket;
      if the bucket does not have room for the hash record, then checking for room in up to N buckets that immediately follow the bucket;
      if one of the N buckets has room for the hash record, then storing the hash record in the one of the N buckets; and
      if neither the bucket nor any of the N buckets has room for the hash record, then not storing any hash record for the key value in the hash table;
   causing a requesting entity to only look for a hash record for a particular key in the bucket of the hash table to which the particular key hashes and the N buckets that immediately follow the bucket to which the particular key hashes;
   responsive to the requesting entity not finding any hash bucket for the particular key in the bucket to which the particular key hashes or the N buckets that immediately follow the bucket, the requesting entity obtaining the information associated with the particular key without using the hash table;
   wherein N remains constant for all hash record insert operations and all hash record lookup operations involving the hash table.

* * * * *

UNITED STATES PATENT AND TRADEMARK OFFICE
CERTIFICATE OF CORRECTION

PATENT NO. : 10,346,315 B2
APPLICATION NO. : 15/606327
DATED : July 9, 2019
INVENTOR(S) : Teotia et al.

Page 1 of 1

It is certified that error appears in the above-identified patent and that said Letters Patent is hereby corrected as shown below:

On the Title Page

On page 2, Column 2, under Other Publications, Line 17, delete "Dragojevié," and insert -- Dragojević, --, therefor.

In the Specification

In Column 21, Line 3, after "OPTIMIZED" insert -- . --.

In the Claims

In Column 31, Line 9, in Claim 5, delete "that that" and insert -- that --, therefor.

Signed and Sealed this
Twenty-eighth Day of July, 2020

Andrei Iancu
*Director of the United States Patent and Trademark Office*